(12) United States Patent
Haag et al.

(10) Patent No.: US 11,921,299 B2
(45) Date of Patent: Mar. 5, 2024

(54) DISPLAY SYSTEM FOR VEHICLE

(71) Applicant: 3M INNOVATIVE PROPERTIES COMPANY, St. Paul, MN (US)

(72) Inventors: Adam D. Haag, Woodbury, MN (US); Stephan J. Pankratz, Eagan, MN (US); Matthew B. Johnson, Woodbury, MN (US); William F. Edmonds, Edina, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 18/266,046

(22) PCT Filed: Nov. 23, 2021

(86) PCT No.: PCT/IB2021/060883
§ 371 (c)(1),
(2) Date: Jun. 8, 2023

(87) PCT Pub. No.: WO2022/136975
PCT Pub. Date: Jun. 30, 2022

(65) Prior Publication Data
US 2023/0393410 A1   Dec. 7, 2023

Related U.S. Application Data

(60) Provisional application No. 63/199,331, filed on Dec. 21, 2020.

(51) Int. Cl.
*B60K 35/00* (2006.01)
*G02B 27/01* (2006.01)
*G02B 27/28* (2006.01)

(52) U.S. Cl.
CPC ............ *G02B 27/281* (2013.01); *B60K 35/00* (2013.01); *G02B 27/0101* (2013.01);
(Continued)

(58) Field of Classification Search
CPC ............ G02B 27/281; G02B 27/0101; G02B 27/283; B60K 35/00; B60K 2370/1529; B60K 2370/27
(Continued)

(56) References Cited

U.S. PATENT DOCUMENTS

| 2012/0293742 A1 | 11/2012 | Banerjee |
| 2017/0052369 A1 | 2/2017 | Shimatani et al. |

(Continued)

OTHER PUBLICATIONS

International Search for PCT International Application No. PCT/IB2021/060883, dated Nov. 23, 2021, 3 pages.

*Primary Examiner* — Joseph P Martinez
*Assistant Examiner* — Grant A Gagnon
(74) *Attorney, Agent, or Firm* — Jonathan L. Tolstedt

(57) ABSTRACT

A display system includes a display panel configured to emit a polarized image light having a first polarization state and at least one emission spectrum having a full width at half maxima (FWHM). The display system includes a reflective polarizer configured to receive and reflect the polarized image light as a first reflected polarized image light. For a first light incident at a first predetermined angle, the reflective polarizer has an average reflectance of greater than about 60% across the at least one emission spectrum for the first polarization state, a transmittance of at least about 50% for at least wavelength outside the FWHM of the at least one emission spectrum for the first polarization state, and an average total transmittance of greater than about 70% across a visible wavelength range including the FWHM of the at least one emission spectrum for an orthogonal second polarization state.

10 Claims, 15 Drawing Sheets

(52) U.S. Cl.
 CPC .... G02B 27/283 (2013.01); *B60K 2370/1529* (2019.05); *B60K 2370/27* (2019.05)

(58) Field of Classification Search
 USPC .......................................................... 359/485
 See application file for complete search history.

(56) References Cited

U.S. PATENT DOCUMENTS

| | | |
|---|---|---|
| 2017/0235030 A1 | 8/2017 | Tanaka et al. |
| 2020/0055400 A1 | 2/2020 | Edmonds et al. |
| 2020/0333597 A1 | 10/2020 | Xu |

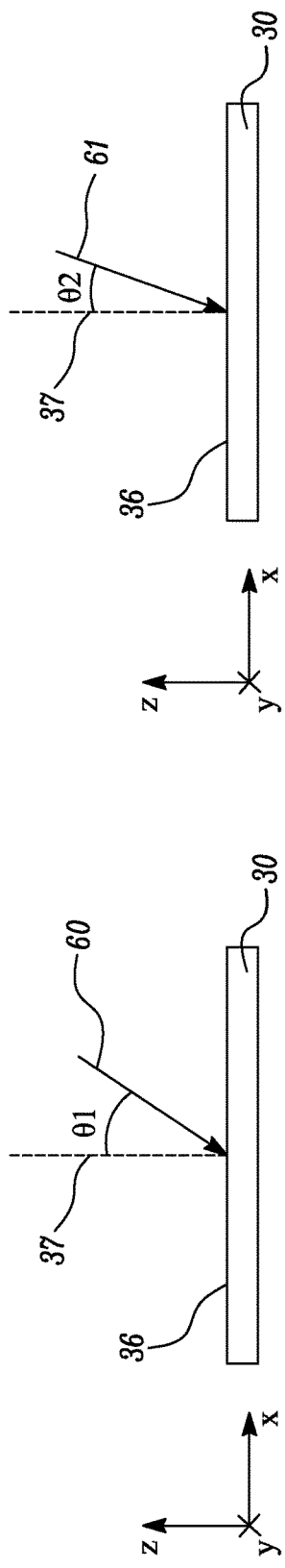
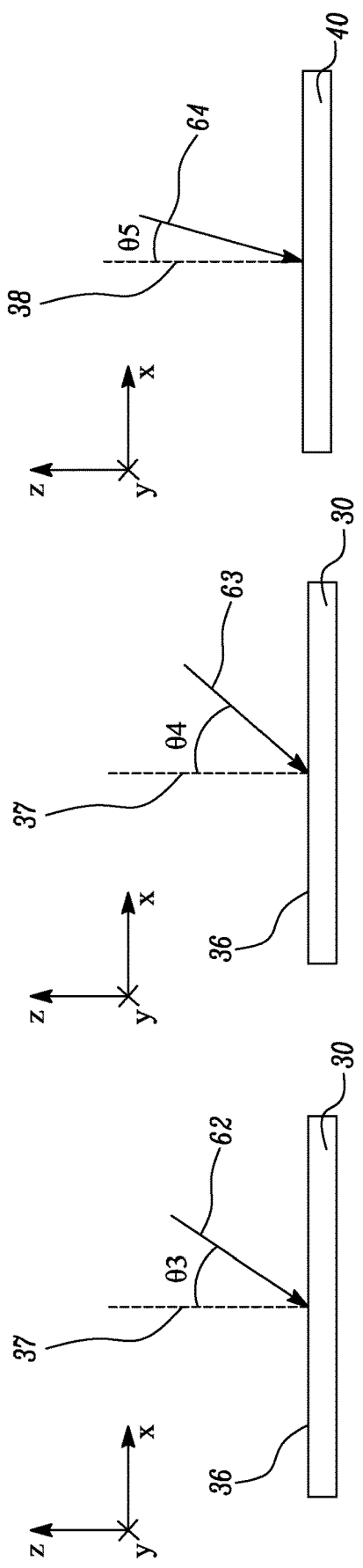

DISPLAY SYSTEM FOR VEHICLE

CROSS REFERENCE TO RELATED APPLICATIONS

This application is a national stage filing under 35 U.S.C. 371 of PCT/IB2021/060883, filed Nov. 23, 2021, which claims the benefit of U.S. Provisional application Ser. No. 63/199,331, filed Dec. 21, 2020, the disclosures of which are incorporated by reference in their entireties herein.

TECHNICAL FIELD

The present disclosure relates generally to a display system used in vehicles, and in particular, to a display system for displaying a virtual image to a passenger of a vehicle.

BACKGROUND

A heads up display (HUD) system is used in a vehicle to present information to a vehicle passenger without requiring the passenger to look away from the vehicle surroundings that can be viewed through a vehicle windshield. HUDs are now increasingly used as a safety feature for vehicles, such as automobiles. A typical HUD includes a display and several mirrors for reflecting and directing emitted light from the display to the passenger.

SUMMARY

In a first aspect, the present disclosure provides a display system for displaying a virtual image to a passenger of a vehicle. The display system includes a display panel and a reflective polarizer. The display panel is configured to emit a polarized image light having a first polarization state and at least one emission spectrum having a full width at half maxima (FWHM). The reflective polarizer is configured to receive and reflect the polarized image light as a first reflected polarized image light. The reflective polarizer includes a reflection spectrum including at least one reflection band having a FWHM. For a first light incident at a first predetermined angle from about 30 degrees to about 50 degrees with respect to a normal to a major surface of the reflective polarizer, for the first polarization state, the reflective polarizer reflects at least about 60% of the first light for at least one same first wavelength within the FWHM of the at least one reflection band and within the FWHM of the at least one emission spectrum. For the first light incident at the first predetermined angle from about 30 degrees to about 50 degrees with respect to the normal to the major surface of the reflective polarizer, for the first polarization state, the reflective polarizer transmits at least about 50% of the first light for at least one same second wavelength outside the FWHM of the at least one emission spectrum and outside the FWHM of the at least one reflection band. For the first light incident at the first predetermined angle from about 30 degrees to about 50 degrees with respect to the normal to the major surface of the reflective polarizer, for an orthogonal second polarization state, the reflective polarizer transmits at least about 60% of the first light for each wavelength in the FWHM of the at least one emission spectrum and the FWHM of the at least one reflection band. For a second light incident at a second predetermined angle less than about 30 degrees with respect to the normal to the major surface of the reflective polarizer, and for each of the first and second polarization states, the reflective polarizer transmits at least about 50% of the second light for the at least first wavelength.

In a second aspect, the present disclosure provides a display system for displaying a virtual image to a passenger of a vehicle. The display system includes a display panel and a reflective polarizer. The display panel is configured to emit a polarized image light having a first polarization state and substantially distinct blue, green, and red emission spectra having respective blue, green, and red full widths at half maxima (FWHMs). The reflective polarizer is configured to receive and reflect the polarized image light as a first reflected polarized image light. The reflective polarizer includes a reflection spectrum including substantially distinct blue, green, and red reflection bands with respective blue, green, and red FWHMs. For a first light incident at a first predetermined angle from about 30 degrees to about 50 degrees with respect to a normal to a major surface of the reflective polarizer, for the first polarization state, the reflective polarizer reflects at least about 60% of the first light for at least one same first wavelength within each of the FWHMs of the blue, green and red reflection bands and within each of the respective FWHMs of the blue, green, and red emission spectra. For the first light incident at the first predetermined angle from about 30 degrees to about 50 degrees with respect to the normal to the major surface of the reflective polarizer, for the first polarization state, the reflective polarizer transmits at least about 50% of the first light for at least one same second wavelength between the FWHMs of the blue and green reflection bands and between the FWHMs of the blue and green emission spectra, and for at least one same third wavelength between the FWHMs of the green and red reflection bands and between the FWHMs of the green and red emission spectra. For the first light incident at the first predetermined angle from about 30 degrees to about 50 degrees with respect to the normal to the major surface of the reflective polarizer, for an orthogonal second polarization state, the reflective polarizer transmits at least about 60% of the first light for each wavelength in the FWHMs of the blue, green and red reflection bands, each wavelength in the FWHMs of the blue, green and red emission spectra, and each wavelength therebetween. For a second light incident at a second predetermined angle less than about 30 degrees with respect to the normal to the major surface of the reflective polarizer, and for each of the first and second polarization states, the reflective polarizer transmits at least about 50% of the second light for the at least first wavelength.

In a third aspect, the present disclosure provides a display system for displaying a virtual image to a passenger of a vehicle. The display system includes a display panel and a reflective polarizer. The display panel is configured to emit a polarized image light having a first polarization state and substantially distinct blue, green, and red emission spectra having respective blue, green, and red full widths at half maxima (FWHMs). The reflective polarizer is configured to receive and reflect the polarized image light as a first reflected polarized image light. The first reflected polarized image light is configured to be reflected toward the passenger after reflection from at least a windshield of the vehicle. For a first light incident at a first predetermined angle from about 30 degrees to about 50 degrees with respect to a normal to a major surface of the reflective polarizer, the reflective polarizer has an average total reflectance of greater than about 60% for the first polarization state across each of the blue, green and red FWHMs. For the first light incident at the first predetermined angle from about 30 degrees to about 50 degrees with respect to the normal to the major surface of the reflective polarizer, the reflective polarizer has, for the first polarization state, a transmittance of at least about 50% for at least one wavelength between the FWHMs of the blue and green emission spectra, and for at least one other wavelength between the FWHMs of the green and red emission spectra. For the first light incident at the first predetermined angle from about 30 degrees to about 50 degrees with respect to the normal to the major surface of the reflective polarizer, the reflective polarizer has an average total transmittance of greater than about 70% across a visible wavelength range including at least each of the blue, green and red FWHMs for an orthogonal second polarization state. For a second light incident at a second predetermined angle less than about 30 degrees with respect to the normal to the major surface of the reflective polarizer, and for each of the first and second polarization states, the reflective polarizer has an average total transmittance of at least about 50% across each of the blue, green and red FWHMs.

The details of one or more examples of the disclosure are set forth in the accompanying drawings and the description below. Other features, objects, and advantages of the disclosure will be apparent from the description and drawings, and from the claims.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

FIGS. 6A-6D illustrate schematic views of the reflective polarizer of the display system, according to an embodiment of the present disclosure;

FIG. 6E illustrates a schematic view of a mirror of the display system, according to an embodiment of the present disclosure;

DETAILED DESCRIPTION

Figure 1:
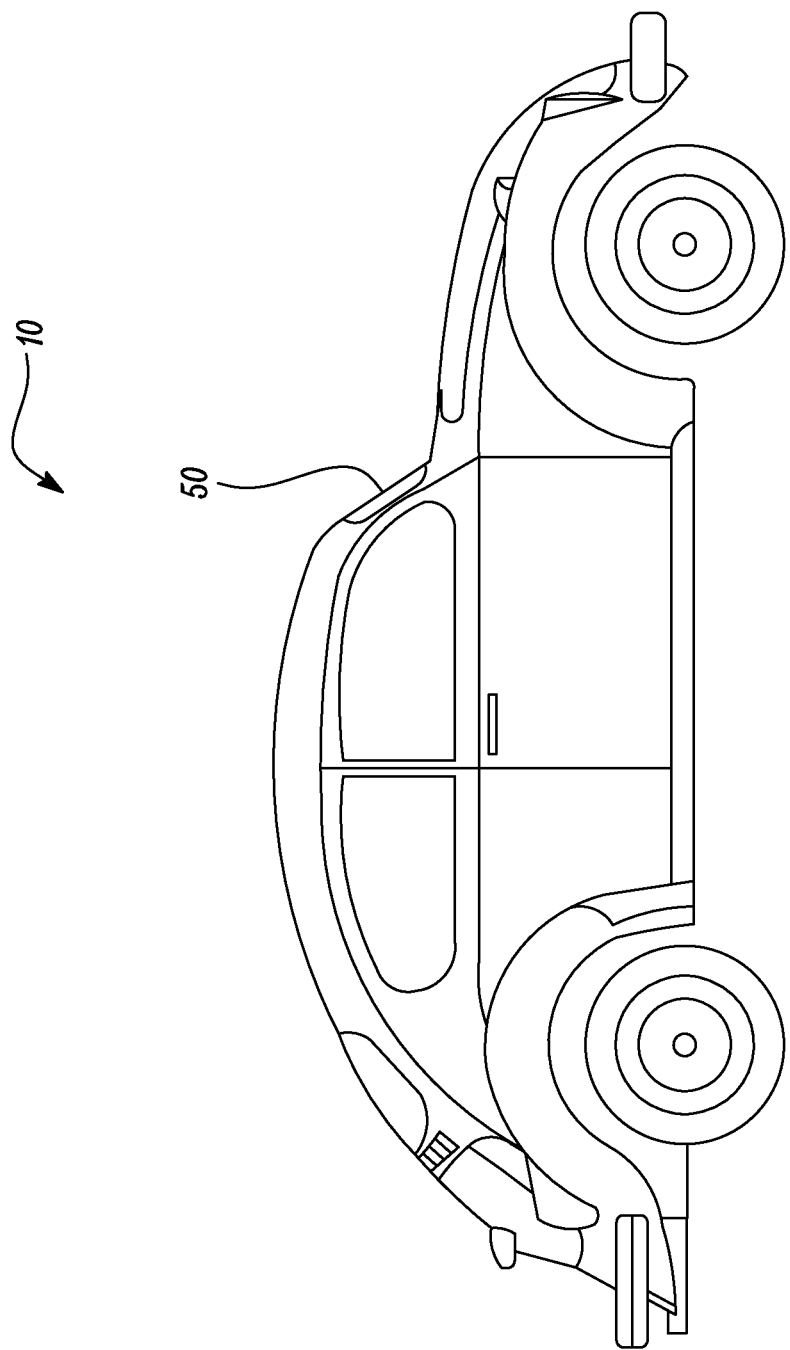
FIG. 1 illustrates a schematic side view of an example of a vehicle having a windshield.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a display system for displaying a virtual image for viewing by a passenger of a vehicle. The display system may be a heads up display (HUD). The display system may be used in various vehicles, such as aircrafts, watercrafts, or landcrafts (including motor vehicles, such as automobiles, trucks, and motorcycles).

The display system includes a display panel and a reflective polarizer. The display panel emits a polarized image light having a first polarization state and at least one emission spectrum having a full width at half maxima (FWHM). The reflective polarizer receives and reflects the polarized image light as a first reflected polarized image light. The reflective polarizer includes a reflection spectrum including at least one reflection band having a FWHM. For a first light incident at a first predetermined angle from about 30 degrees to about 50 degrees with respect to a normal to a major surface of the reflective polarizer and for the first polarization state, the reflective polarizer reflects at least about 60% of the first light for at least one same first wavelength within the FWHM of the at least one reflection band and within the FWHM of the at least one emission spectrum. Further, for the first light incident at the first predetermined angle and for the first polarization state, the reflective polarizer transmits at least about 50% of the first light for at least one same second wavelength outside the FWHM of the at least one emission spectrum and outside the FWHM of the at least one reflection band. Further, for the first light incident at the first predetermined angle and for an orthogonal second polarization state, the reflective polarizer transmits at least about 60% of the first light for each wavelength in the FWHM of the at least one emission spectrum and the FWHM of the at least one reflection band. For a second light incident at a second predetermined angle less than about 30 degrees with respect to the normal to the major surface of the reflective polarizer, and for each of the first and second polarization states, the reflective polarizer transmits at least about 50% of the second light for the at least first wavelength.

In some examples, the multilayer optical film useful for the reflective polarizer may be fabricated by coextrusion. The fabrication method may comprise: (a) providing at least a first and a second stream of resin corresponding to the first and second polymers to be used in the finished film; (b) dividing the first and the second streams into a plurality of layers using a suitable feedblock, such as one that comprises: (i) a gradient plate comprising first and second flow channels, where the first channel has a cross-sectional area that changes from a first position to a second position along the flow channel, (ii) a feeder tube plate having a first plurality of conduits in fluid communication with the first flow channel and a second plurality of conduits in fluid communication with the second flow channel, each conduit feeding its own respective slot die, each conduit having a first end and a second end, the first end of the conduits being in fluid communication with the flow channels, and the second end of the conduits being in fluid communication with the slot die, and (iii) optionally, an axial rod heater located proximal to said conduits; (c) passing the composite stream through an extrusion die to form a multilayer web in which each layer is generally parallel to the major surface of adjacent layers; and (d) casting the multilayer web onto a chill roll, sometimes referred to as a casting wheel or casting drum, to form a cast multilayer film. This cast film may have the same number of layers as the finished film, but the layers of the cast film are typically much thicker than those of the finished film.

After cooling, the multilayer web can be re-heated and drawn or stretched to produce the near-finished multilayer optical film. The drawing or stretching accomplishes two goals: it thins the layers to their desired final thicknesses profile, and it orients the layers such that at least some of the layers become birefringent. The orientation or stretching can be accomplished along the cross-web direction (e.g. via a tenter), along the down-web direction (e.g. via a length orienter), or any combination thereof, whether simultaneously or sequentially. If stretched along only one direction, the stretch can be "unconstrained" (wherein the film is allowed to dimensionally relax in the in-plane direction perpendicular to the stretch direction) or "constrained" (wherein the film is constrained and thus not allowed to dimensionally relax in the in-plane direction perpendicular to the stretch direction). If stretched along both in-plane directions, the stretch can be symmetric, i.e., equal along the orthogonal in-plane directions, or asymmetric. Alternatively, the film may be stretched in a batch process. In any case, subsequent or concurrent draw reduction, stress or strain equilibration, heat setting, and other processing operations can also be applied to the film.

The polymers of the various layers are preferably chosen to have similar rheological properties, e.g., melt viscosities, so that they can be co-extruded without significant flow disturbances. Extrusion conditions may be chosen to adequately feed, melt, mix, and pump the respective polymers as feed streams or melt streams in a continuous and stable manner. Temperatures used to form and maintain each of the melt streams may be chosen to be within a range that avoids freezing, crystallization, or unduly high pressure drops at the low end of the temperature range, and that avoids material degradation at the high end of the range.

The multilayer optical films can be made using any suitable light-transmissive materials, but in many cases, it is beneficial to use low absorption polymer materials. With such materials, absorption of a microlayer stack over visible and infrared wavelengths can be made small or negligible, such that the sum of reflection and transmission for the stack (or an optical film of which it is a part), at any given wavelength and for any specified angle of incidence and polarization state, is approximately 100%, i.e., R+T≈100%, or R≈100%−T. Exemplary multilayer optical films are composed of polymer materials and may be fabricated using coextruding, casting, and orienting processes. Reference is made to U.S. Pat. No. 5,882,774 (Jonza et al.) "Optical Film", U.S. Pat. No. 6,179,948 (Merrill et al.) "Optical Film and Process for Manufacture Thereof", U.S. Pat. No. 6,783,349 (Neavin et al.) "Apparatus for Making Multilayer Optical Films", and patent application publication US 2011/0272849 (Neavin et al.) "Feedblock for Manufacturing Multilayer Polymeric Films".

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. Such films are compatible with high volume manufacturing processes and can be made in large sheets and roll goods.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Thicker layers may be included, such as skin layers at the outer surfaces of the multilayer optical film, or protective boundary layers (PBLs) disposed within the multilayer optical films, that separate coherent groupings (referred to herein as "packets") of microlayers.

For polarizing applications, e.g., for reflective polarizers, at least some of the optical layers are formed using birefringent polymers, in which the polymer's index of refraction has differing values along orthogonal Cartesian axes of the polymer. Generally, birefringent polymer microlayers have their orthogonal Cartesian axes defined by the normal to the layer plane (z-axis), with the x-axis and y-axis lying within the layer plane. Birefringent polymers can also be used in non-polarizing applications.

In some cases, the microlayers have thicknesses and refractive index values corresponding to a ¼-wave stack, i.e., arranged in optical repeat units or unit cells each having two adjacent microlayers of equal optical thickness (f-ratio=50%), such optical repeat unit being effective to reflect by constructive interference light whose wavelength λ is twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.)

and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing or reflecting layer can be included at the incident side of the film to protect components from degradation caused by UV light. The multilayer optical films can be attached to mechanically reinforcing layers using a UV-curable acrylate adhesive or other suitable material for substantially absorbing or reflecting UV light. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, sometimes followed by passing the multilayer extrudate through one or more multipliers, and then stretching or otherwise orienting the extrudate to form a final film. The resulting film is typically composed of hundreds of individual microlayers whose thicknesses and refractive indices are tailored to provide one or more reflection bands in desired region(s) of the spectrum, such as in the visible or near infrared. To achieve a specific target reflectivities with a reasonable number of layers, adjacent microlayers typically exhibit a difference in refractive index ($\Delta n_x$) for light polarized along the x-axis of at least 0.04. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

Optical modeling of multilayer optical films is computationally intensive, but well understood given that each layer's indices of refraction and thickness are known. From a known set of refraction values and thicknesses, an optical spectrum for transmission and reflection of each polarization state may be rigorously calculated based on well-known optical principles and multilayer modelling technique commonly referred to as Transfer Matrix Methods. By comparing the calculated optical spectrum to the measured optical spectrum from the fabricated multilayer optical films, we may iteratively determine corrections to layer parameters until the modelled result for the optical spectrum best matches the experimentally measured optical spectrum. By this iterative modelling method, the optical parameters for indices of refraction and layer thickness may be determined from the measured optical spectrum of a multilayer optical film with a high degree of confidence.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

The '774 (Jonza et al.) patent also discusses certain design considerations relating to multilayer optical films configured as polarizers, referred to as multilayer reflecting or reflective polarizers. In general, the transmission of any reflective polarizer is dependent on the polarization of the incident light and the azimuthal orientation of that light with respect to the principal axes of the polarizer. In many applications, the ideal reflecting polarizer has high reflectance along one axis (the "extinction" or "block" axis) and zero reflectance along the other axis (the "transmission" or "pass" axis). For the purposes of this application, light whose polarization state is substantially aligned with the pass axis or transmission axis is referred to as pass light and light whose polarization state is substantially aligned with the block axis or extinction axis is referred to as block light. Unless otherwise indicated, pass light at 600 incidence is measured in p-polarized pass light along the pass axis of the reflecting polarizer. If some reflectivity occurs along the transmission axis, the contrast of the polarizer at off-normal angles may be reduced, and if the reflectivity is different for various wavelengths, color may be introduced into the transmitted light. Furthermore, exact matching of the two y indices and the two z indices may not be possible in some multilayer systems, and if the z-axis indices are not matched, introduction of a slight mismatch may be desired for in-plane indices n1y and n2y. In particular, by arranging the y-index mismatch to have the same sign as the z-index mismatch, a Brewster effect is produced at the interfaces of the microlayers, to minimize off-axis reflectivity, and therefore off-axis color, along the transmission axis of the multilayer reflecting polarizer.

Sunlight incident on the display panels of conventional display systems or HUDs may cause thermal management issues by heating the display panel. In some cases, cold mirrors are used in HUDs to allow a portion of sunlight to pass into a heat sink while reflecting sunlight in a visible wavelength range. However, the cold mirrors are generally broadband mirrors. Since a significant amount of solar energy is in the visible wavelength range, the cold mirrors still reflect a large amount of solar energy toward the display panel. Sunlight incident on the display systems or HUDs may further cause a temporary failure of or a permanent damage to the display panel. Thus, reduction in reflected sunlight towards the display panel may be required.

The reflective polarizer of the present disclosure may be a notched reflective polarizer including at least one reflection band that is selected based on the at least one emission spectrum of the display panel, such that the reflective polarizer transmits a significant portion of light incident at a predetermined angle for one or more same wavelengths outside the FHWM of the at least one emission spectrum and outside the FWHM of the at least one reflection band. The predetermined angle may correspond to a design incident angle of the display system including the reflective polarizer. Therefore, the at least one reflection band may be optimized for incident angles used in the display system. For the second polarization state, the reflective polarizer may also substantially transmit light incident at the predetermined angle. Light incident at the predetermined angle in the first polarization state for wavelengths outside the FWHM of the at least one emission spectrum may be from external sources (e.g., sunlight), and is not used for generating the virtual image. Light incident at the predetermined angle in the second polarization state may also be from the external sources. A portion of light incident at the predetermined angle and transmitted by the reflective polarizer may not be received by the display panel. Thus, the reflective polarizer may transmit a substantial portion of light that originated from the external sources and thus prevent the substantial portion of light from reaching the display panel. The reflective polarizer may therefore mitigate heating of the display panel due to light from the external sources. This reduction in reflected light toward the display panel may be significant, and may prevent temporary failure of or a permanent damage to the display panel.

As discussed above, the reflective polarizer may substantially reflect light incident at the predetermined angle for the first polarization state and for at least one same wavelength within the FWHM of the at least one reflection band and the FWHM of the at least one emission spectrum. The reflective polarizer may substantially transmit light incident at the predetermined angle for the first polarization state and for at least one same wavelength outside the FWHM of the at least one reflection band and the FWHMs of the at least one emission spectrum. Thus, the reflective polarizer may improve the thermal management of the display panel.

In addition, the reflective polarizer may substantially transmit light incident at the predetermined angle for the second polarization state, thereby further improving the thermal management of the display panel.

Further, the reflective polarizer may substantially transmit light incident at an angle less than about 30 degrees. This may further ensure that any stray light that is not used for generating the virtual image, is substantially transmitted by the reflective polarizer and may not be received by the display panel. Thus, the reflective polarizer may further improve the thermal management of the display panel. The reflective polarizer may therefore act as both a spectral filter and a spatial filter for incident light.

Further, the reflective polarizer may reduce a total energy of light (e.g., solar light) reflected towards the display panel by at least about 70%, as compared to a total energy of light reflected towards the display panel by conventional broadband cold mirrors or a conventional broadband polarizer.

Moreover, the reflective polarizer may substantially reflect light incident at angles that deviate from the predetermined angle within an acceptable range (e.g., 5 degrees or 10 degrees). Therefore, the reflective polarizer may ensure proper functioning of the display panel for acceptable deviations from the predetermined angle, while substantially transmitting light from the external sources. The at least one reflection band may shift due to a deviation in an incident angle of light from the predetermined angle. For acceptable deviations, the FWHM of the at least one reflection band of the reflective polarizer may at least partially overlap with the FWHM of the at least one emission spectrum of the display panel. This overlap may allow at least partial reflection of light received from the display panel in case of acceptable deviations. However, for incident angles with large deviations from the predetermined angle, the FWHM of the at least one reflection band may not overlap with the FWHM of the at least one reflection band. Thus, external light (e.g., stray light) incident at angles that deviate considerably from the predetermined angle may be substantially transmitted by the reflective polarizer.

The reflective polarizer may also have low color shift for light incident at angles that deviate from the predetermined angle within the acceptable range. Since the FWHM of the at least one reflection band of the reflective polarizer may at least partially overlap with the FWHM of the at least one emission spectrum of the display panel for acceptable deviations, corresponding color shifts may also be low.

The at least one reflection band may have a suitable bandwidth so that the reflective polarizer can transmit a substantial portion of incident light for wavelengths outside the at least one reflection band, while at least partially reflecting light for acceptable deviations from the design incident angle. Magnitudes of shifts of the at least one reflection band for corresponding deviations in incident angles from the design incident angle may also be appropriately chosen.

Referring now to the Figures, FIG. 1 schematically shows a side view of an example vehicle 10 that may implement illustrative embodiments of the present disclosure. The vehicle 10 may include any navigable vehicle that may be operated on a road surface, and includes, without limitation, cars, buses, motorcycles, off-road vehicles, and trucks. In some other embodiments, the vehicle 10 may also include water vehicles and aircrafts. The vehicle 10 includes a windshield 50. The windshield 50 may include any of a wide variety of transparent members, and can be unitary or laminated, flat or curved (simple or compound curvature), water clear or tinted, can have focusing properties, and can be composed of any conventional glasses and/or plastics. In some cases, the windshield 50 may include a sheet of glass or other transparent material with two opposing surfaces.

Figure 2:
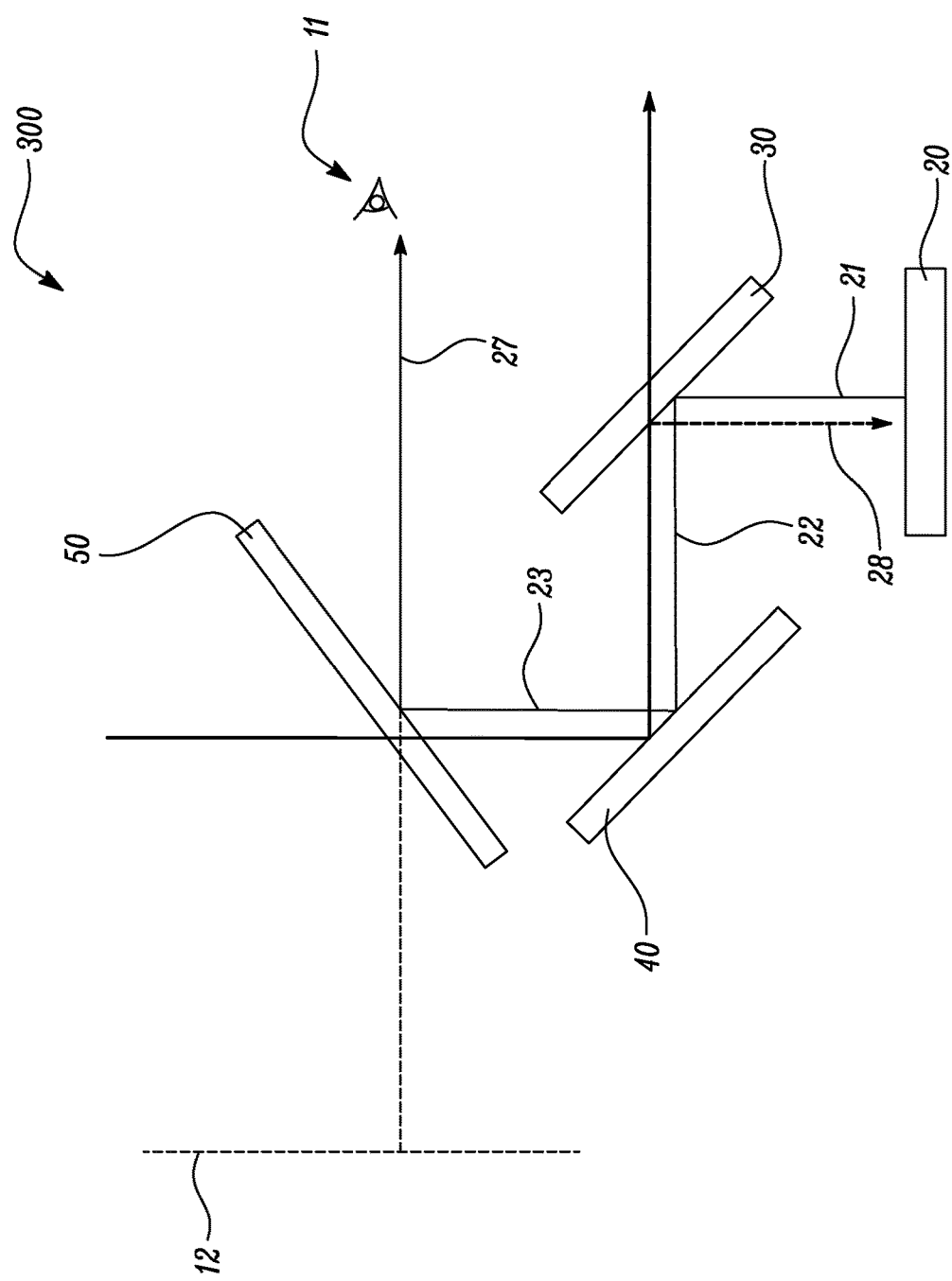
FIG. 2 illustrates a schematic view of a display system, according to an embodiment of the present disclosure.

FIG. 2 illustrates a display system 300 for displaying a virtual image 12 to a passenger 11 of the vehicle 10 (shown in FIG. 1). The display system 300 includes a display panel 20 and a reflective polarizer 30. In the illustrated embodiment of FIG. 2, the display system 300 further includes a mirror 40. In some embodiments, the display system 300 is a HUD. The display system 300 displays information to the passenger 11 of the vehicle 10. The passenger 11 may be a driver of the vehicle 10. The display system 300 displays the information in the driver's view, so that the driver may not need to look away from the windshield 50 while driving to see the information displayed. The display system 300 of the vehicle 10 as disclosed in the present disclosure may be configured to, and without limitation, display any type of information, such as map related information, navigation instructions, certain type of warning or alerts, automatic driving assistance information, vehicle's speed, fuel level, engine temperature, communication events, and other related information on the windshield 50 of the vehicle 10. The display of such information on the windshield 50 of the vehicle 10 may also be represented without limitation in any form, such as digital gauges, text boxes, animated images, or any other graphical representation. Further, the display system 300 of the vehicle 10 may also present augmented reality graphic elements which augment a physical environment surrounding the vehicle 10 with real-time information.

The display panel 20 may include various elements, such as an electroluminescent panel, an incandescent or a phosphorescent light source, a cathode ray tube (CRT), light emitting diodes (LEDs), lenses, collimators, reflectors, and/or polarizers. In some embodiments, the display panel 20 may include an organic light emitting diode (OLED) display panel. In some other embodiments, the display panel 20 may include a liquid crystal display (LCD) panel. The virtual image 12 can be substantially monochromatic, polychromatic, narrow band, or broad band, but preferably overlaps at least a portion of the visible spectrum. Furthermore, the display panel 20 may also include a mechanism, such as a tilting mirror or displacement means, to change the angle and/or position of the virtual image 12 so as to accommodate the passenger 11 at different positions or heights.

Figure 8:
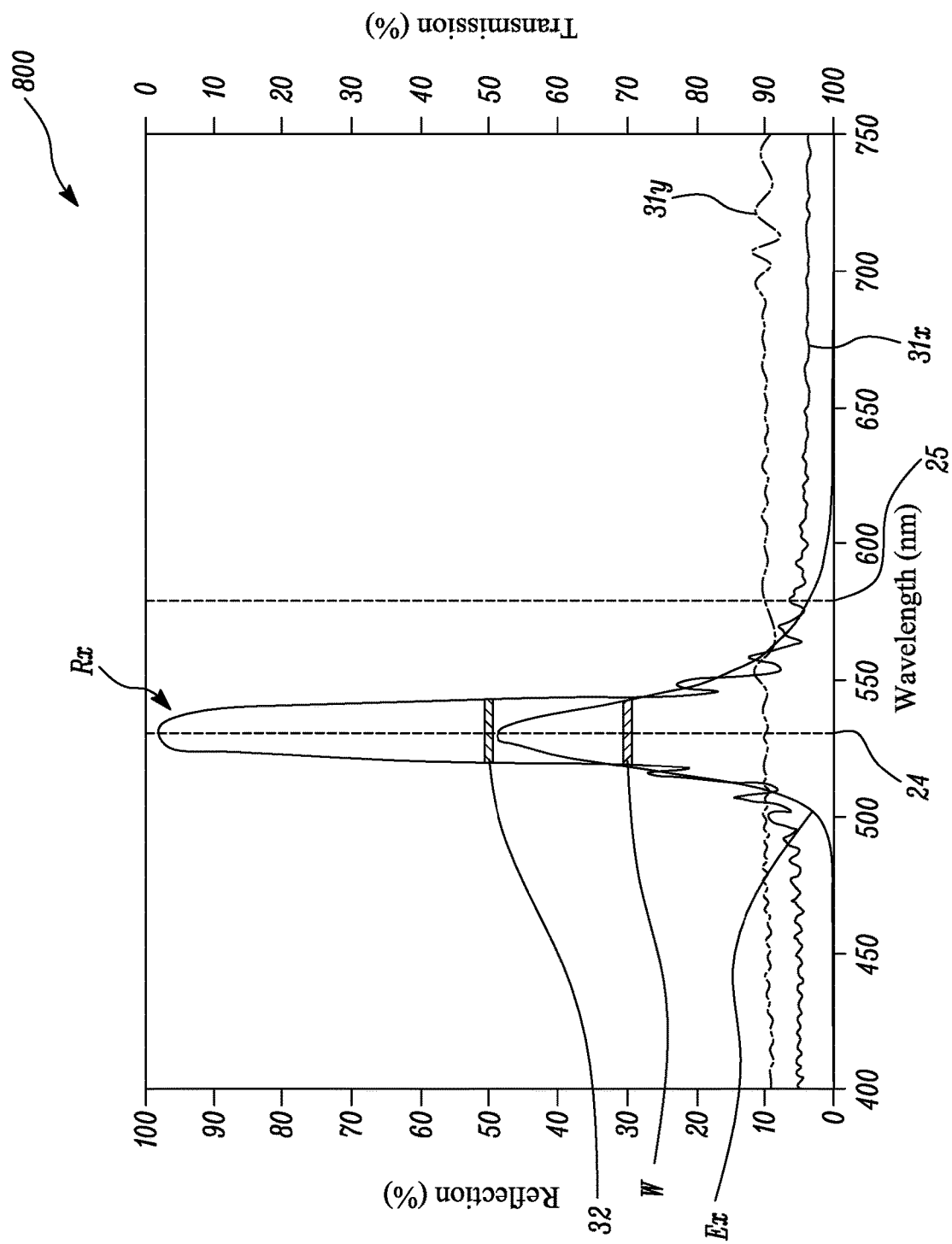
FIGS. 8-10 are graphs illustrating reflectance versus wavelength of a reflective polarizer corresponding to different incident angles, according to an embodiment of the present disclosure.

Referring to FIGS. 1, 2 and 8, the display panel 20 is configured to emit a polarized image light 21 having a first polarization state and at least one emission spectrum Ex having a full width at half maxima (FWHM) W. In some embodiments, the at least one emission spectrum Ex includes at least one of blue, green, and red emission spectra having respective blue, green and red FWHMs. In some other embodiments, the at least one emission spectrum Ex may include the blue, green and red emission spectra having the respective blue, green and red FWHMs. In the illustrated embodiment of FIG. 8, the at least one emission spectrum Ex includes the green emission spectrum having the FWHM W. However, the display panel 20 may have any number of emission spectra with suitable wavelength bands as per desired application attributes.

The reflective polarizer 30 is configured to receive and reflect the polarized image light 21 as a first reflected polarized image light 22. The reflective polarizer 30 may be a notched reflective polarizer having a notch or a band. In some other embodiments, the reflective polarizer 30 may have multiple notches or bands. The reflective polarizer 30 includes a reflection spectrum 31$x$. The reflection spectrum 31$x$ includes at least one reflection band Rx having a FWHM 32 for the first polarization state. In some embodiments, the at least one reflection band Rx includes at least one of blue, green, and red reflection bands having respective blue, green, and red FWHMs. In some other embodiments, the at least one reflection band Rx may include the blue, green, and red reflection bands having the respective blue, green, and red FWHMs. In the illustrated embodiment of FIG. 8, the at least one reflection band Rx includes the green reflection band having the FWHM 32. The FWHM 32 may be the green FWHM. In some embodiments, the reflective polarizer 30 has a reflection spectrum 31$y$ for a second polarization state orthogonal to the first polarization state.

The first reflected polarized image light 22 is configured to be reflected toward the passenger 11 after reflection from at least the windshield 50 of the vehicle 10. In some embodiments, the windshield 50 is configured to receive and reflect between 5% to 40% of a second reflected polarized image light 23 as a third reflected polarized image light 27 toward the passenger 11 of the vehicle 10. In the illustrated embodiment of FIG. 2, the mirror 40 is configured to receive and reflect the first reflected polarized image light 22 as the second reflected polarized image 23 toward the windshield 50 of the vehicle 10.

Figure 11:
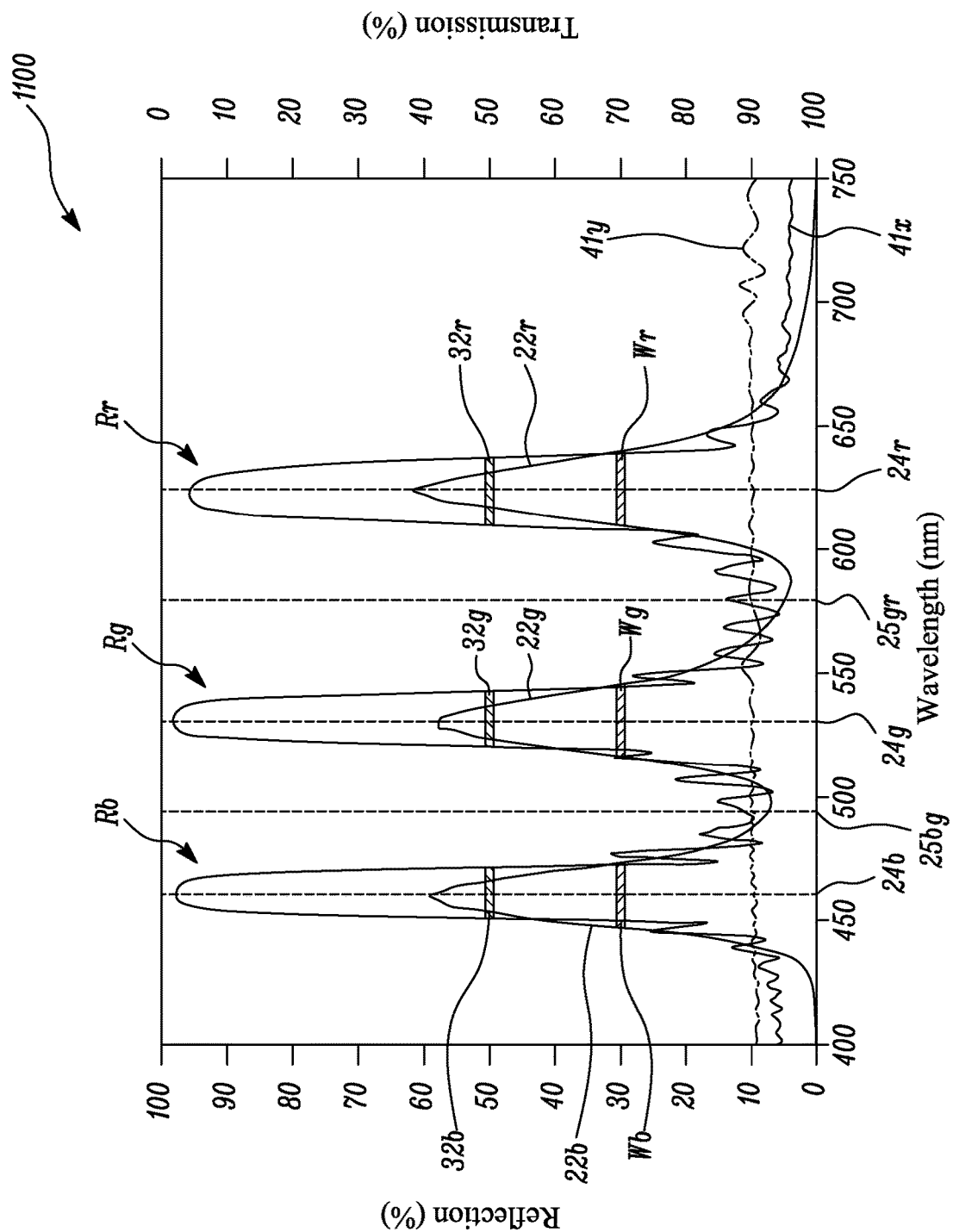
FIGS. 11-13 are graphs illustrating reflectance versus wavelength of a reflective polarizer corresponding to different incident angles, according to another embodiment of the present disclosure.

Referring to FIGS. 1, 2, and 11, in some embodiments, the display panel 20 is configured to emit the polarized image light 21 having the first polarization state and substantially distinct blue, green, and red emission spectra 22$b$, 22$g$, 22$r$ having respective blue, green, and red FWHMs Wb, Wg, Wr. The blue, green, and red emission spectra 22$b$, 22$g$, 22$r$ may together form a total emission spectrum or characteristic of the display panel 20.

The reflective polarizer 30 is configured to receive and reflect the polarized image light 21 as the first reflected polarized image light 22. In the illustrated embodiment of FIG. 11, the reflective polarizer 30 has three notches or bands. The reflective polarizer 30 includes a reflection spectrum 41$x$ for the first polarization state. The reflection spectrum 41$x$ includes substantially distinct blue, green, and red reflection bands Rb, Rg, Rr with respective blue, green, and red FWHMs 32$b$, 32$g$, 32$r$. The reflective polarizer 30 has a reflection spectrum 41$y$ for the second polarization state.

Figure 3:
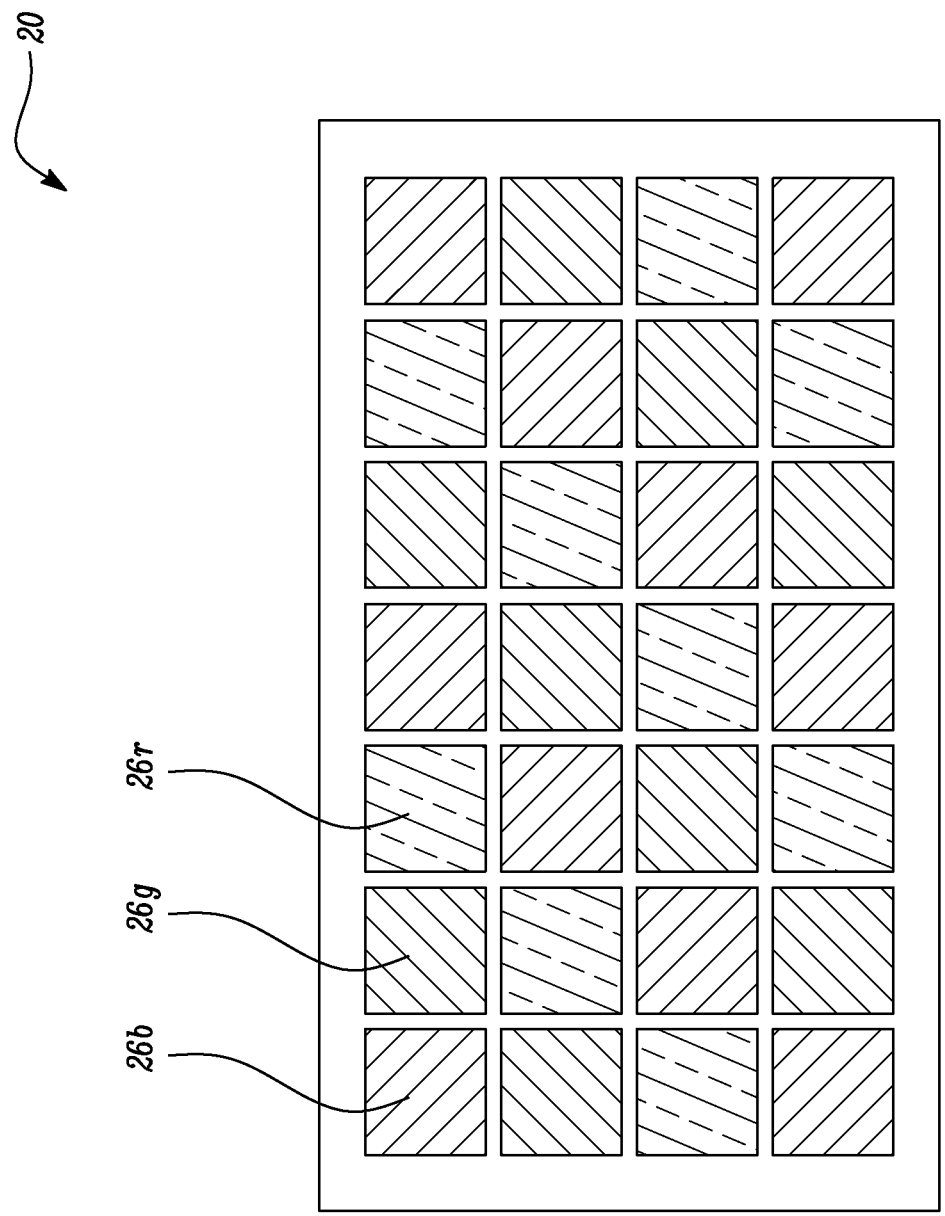
FIG. 3 illustrates a schematic view of a display panel for the display system of FIG. 2.

FIG. 3 illustrates a schematic view of the display panel 20 of the display system 300 shown in FIG. 2. The display panel 20 includes a plurality of blue, green, and red pixels 26$b$, 26$g$, 26$r$. The plurality of blue, green, and red pixels 26$b$, 26$g$, 26$r$ are configured to emit the polarized image light 21 (shown in FIG. 1) having the first polarization state. Lights emitted by the plurality of blue, green, and red pixels 26$b$, 26$g$, 26$r$ have the respective blue, green and red emission spectra 22$b$, 22$g$, 22$r$ (shown in FIG. 11).

Figure 4:
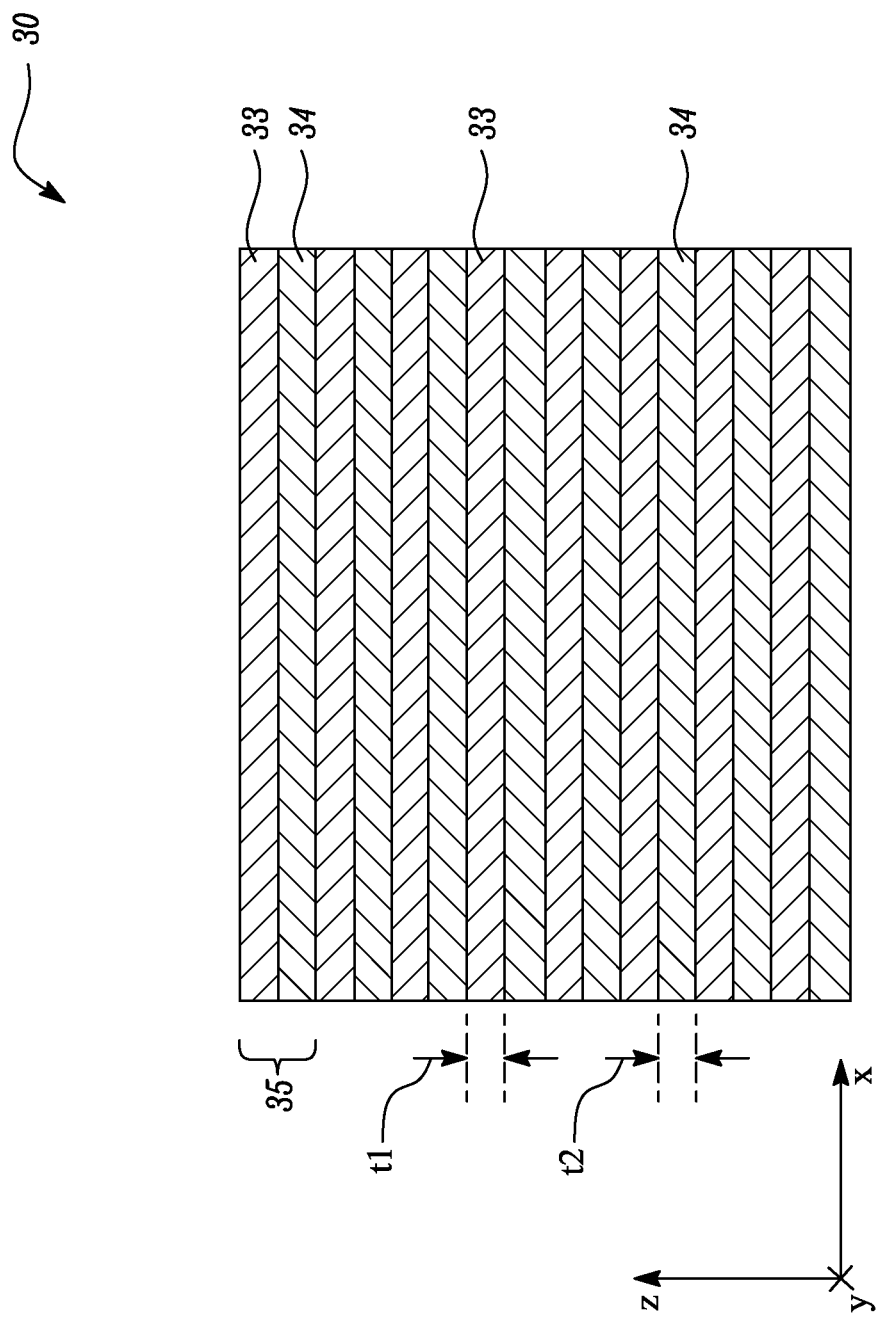
FIG. 4 illustrates a detailed schematic view of a reflective polarizer of the display system, according to an embodiment of the present disclosure.

FIG. 4 illustrates a detailed schematic view of the reflective polarizer 30 according to an embodiment of the present disclosure. The reflective polarizer 30 defines mutually orthogonal x, y, and z-axes. The x and y-axes are in-plane axes of the reflective polarizer 30, while the z-axis is a transverse axis disposed along a thickness of the reflective polarizer 30. In other words, the x and y-axes are disposed along a plane of the reflective polarizer 30, while the z-axis is perpendicular to the plane of the reflective polarizer 30. In some embodiments, the first polarization state is defined along the x-axis, while the second polarization state is defined along the y-axis.

As shown in FIG. 4, the reflective polarizer 30 includes a plurality of alternating first and second polymeric layers 33, 34. In some embodiments, each first polymeric layer 33 may include a first material and each second polymeric layer 34 may include a second material. In some embodiments, each first polymeric layer 33 includes a polyethylene terephthalate (PET). In some embodiments, each first polymeric layer 33 includes the polyethylene naphthalate (PEN) and the PET or copolymer of the combination either produced during resin manufacturing or by extrusion but not limited to either. In some embodiments, each second polymeric layer 34 includes a copolyester. In some embodiments, each second polymeric layer 34 includes a polycarbonate and the copolyester. In some embodiments, the polycarbonate and the copolyester can be produced as blended alloy or copolymer. In some embodiments, the plurality of alternating first and second polymeric layers 33, 34 number at least 100 in total. In some other embodiments, the plurality of alternating first and second polymeric layers 33, 34 number at least 120, at least 140, at least 160, at least 180, at least 200, at least 250, or at least 300 in total.

The plurality of alternating first and second polymeric layers 33, 34 are stacked in an alternating arrangement to form optical repeat units (ORU) 35. In some embodiments, the reflective polarizer 30 includes more than 6 ORUs. In some embodiments, the reflective polarizer 30 includes more than 10 ORUs, more than 20 ORUs, more than 30 ORUs, more than 50 ORUs, more than 100 ORUs, or more than 120 ORUs.

In some embodiments, the first and second polymeric layers 33, 34 may have different refractive index characteristics so that some light is reflected at interfaces between adjacent layers of the plurality of alternating first and second polymeric layers 33, 34. Each of the alternating first and second polymeric layers 33, 34 may be thin enough so that light reflected at a plurality of the interfaces undergoes constructive or destructive interference to give the reflective polarizer 30 desired reflective or transmissive properties. For the reflective polarizer 30 designed to reflect light at ultraviolet, visible, or near-infrared wavelengths, each of the alternating first and second polymeric layers 33, 34 generally has an optical thickness (i.e., a physical thickness multiplied by refractive index) of less than about 1 micrometer (m). The reflective polarizer 30 may also include some thicker layers, such as skin layers (not shown) at outer surfaces of the reflective polarizer 30, or protective boundary layers (PBL) disposed within the reflective polarizer 30 that separate the ORUs 35. In some embodiments, the skin layers at the outer surfaces of the reflective polarizer 30 may act as the PBLs of the reflective polarizer 30.

Referring to FIG. 4, each of the alternating first and second polymeric layers 33, 34 has an average thickness t1, t2. Specifically, each of the first polymeric layers 33 has the average thickness t1. Further, each of the second polymeric layers 34 has the average thickness t2. Each of the alternating first and second polymeric layers 33, 34 defines the average thickness t1, t2 along the z-axis. The term "average thickness", as used herein, refers to an average thickness across a plane of a layer. In the illustrated embodiment of FIG. 4, the average thicknesses t1, t2 are measured across the x-y plane. In some embodiments, each of the alternating first and second polymeric layers 33, 34 has the average thickness t1, t2 of less than about 300 nanometers (nm) (i.e., t1, t2<300 nm). In some other embodiments, each of the alternating first and second polymeric layers 33, 34 may have the average thickness t1, t2 of less than about 250 nm, less than about 200 nm, less than about 150 nm, or less than about 130 nm.

The reflective and transmissive properties of reflective polarizer 30 may be a function of refractive indices of the alternating first and second polymeric layers 33, 34, the average thicknesses t1, t2, and thickness distribution of the each of the alternating first and second polymeric layers 33, 34. In some cases, each first polymeric layer 33 of the ORUs 35 may include birefringent materials. In some cases, each second polymeric layer 34 the ORUs 35 may include isotropic materials.

In some embodiments, each ORU 35 includes a high index optical (HIO) layer and a low index optical (LIO) layer. In some embodiments, each first polymeric layer 33 may be the HIO layer and each second polymeric layer 34 may be the LIO layer.

In some embodiments, the HIO layer may have refractive indices Nx, Ny, and Nz. The refractive indices Nx, Ny, Nz represent the refractive index of the HIO layer along the mutually orthogonal x-, y-, and z-axes, respectively, of the reflective polarizer 30. In some other embodiments, the LIO layer may have a refractive index Niso which represents the refractive index of the LIO layer.

Further, a f-ratio of the ORUs 35 is defined by Equation 1 provided below.

$$f-\text{ratio} = \frac{n1 \cdot t1}{n1 \cdot t1 + n2 \cdot t2} \quad [\text{Equation 1}]$$

In Equation 1, n1 and n2 are respective refractive indices of the first and second polymeric layers 33, 34, respectively, of a given ORU of the ORUs 35, and t1 and t2 are individual average thicknesses of the first and second polymeric layers 33, 34, respectively, of the given ORU of the ORUs 35. n1 is the refractive index of the HIO layer, while n2 is the refractive index of the LIO layer. In some cases, each of t1 and t2 may be substantially equal to each other. In some other embodiments, t1 is different from t2. For example, t1<t2.

In some cases, the ORUs 35 may have the f-ratio of about 0.12. In some cases, the f-ratio may be less than about 0.2, less than about 0.18, less than about 0.16, less than about 0.14, or less than about 0.10.

In some embodiments, the HIO and the LIO layers of the ORUs 35 may include the PET or a PET enhanced with glycol (known as PET-G or PCT-G) or any copolyester, copolyester:polycarbonate alloy or copolymers thereof. In such cases, the ORUs 35 may have higher values of the f-ratio.

A strength of each ORU 35 may be a measure of coherence among adjacent ORUs 35. In some embodiments, the strength of each ORU 35 may be determined based on the f-ratio of each ORU 35, and a difference between the refractive indices of the HIO and the LIO layers of each ORU 35. In some embodiments, a width of the reflection bands Rx, Rr, Rb, Rg (shown in FIGS. 8-13) may be adjusted based on the strength of each ORU 35. Specifically, the FWHMs 32, 32b, 32g, 32r of the reflection bands Rx, Rr, Rb, Rg, respectively may be adjusted based on the strength of each ORU 35.

Figure 5:
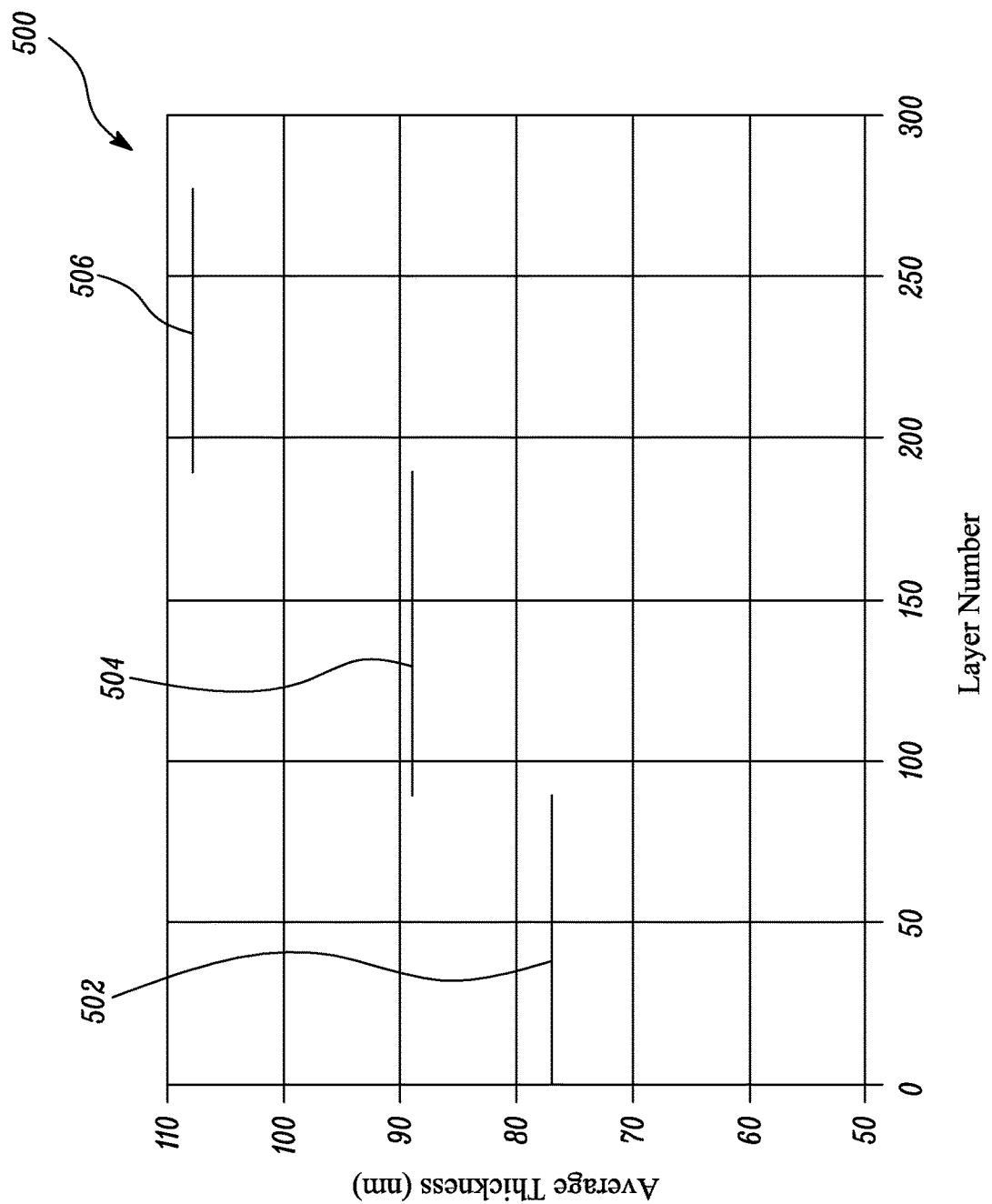
FIG. 5 is a graph illustrating average thickness versus layer number of a plurality of polymeric layers of a reflective polarizer, according to an embodiment of the present disclosure.

FIG. 5 illustrates an exemplary graph 500 depicting average thickness versus layer number profile of the plurality of the first and second polymeric layers 33, 34 (shown in FIG. 4). The graph 500 includes the average thickness on an axis of ordinates and the layer number on an axis of abscissas. The graph 500 further includes plots 502, 504, 506. The plots 502, 504, 506 depict different average thickness in different ranges of the layer numbers. Ranges of layer numbers may be referred to as layer number ranges. The average thickness depicted in the graph 500 is an average thickness of the first and second polymeric layers 33, 34, i.e., (t1+t2)/2. In the illustrated embodiment of FIG. 5, a lowermost polymeric layer is designated as layer number 0. A topmost polymeric layer is designated as layer number 280. The plot 502 depicts that the average thickness of the plurality of first and second polymeric layers 33, 34 is about 77 nm for layer numbers extending from about 0 to about 90. Further, the plot 504 depicts that the average thickness of the plurality of first and second polymeric layers 33, 34 is about 89 nm for layer numbers extending from about 91 to about 190. The average thickness of the plurality of first and second polymeric layers 33, 34 in the layer number range from about 91 to about 190 is relatively higher than the average thickness of the plurality of first and second polymeric layers 33, 34 in the layer number range from about 0 to about 90. Further, the plot 506 depicts that the average thickness of the plurality of first and second polymeric layers 33, 34 is about 108 nm for layer numbers extending from about 191 to about 280. The average thickness of the plurality of first and second polymeric layers 33, 34 in the layer number range from about 191 to about 280 is relatively higher than the average thickness of the plurality of first and second polymeric layers 33, 34 in the layer number range from about 91 to about 190.

As apparent from FIG. 5, the average thickness of the plurality of first and second polymeric layers 33, 34 substantially increases from lower layer numbers to higher layer numbers. In some embodiments, the plurality of first and second polymeric layers 33, 34 in the layer number range from about 0 to about 90 may form a first packet of the plurality of first and second polymeric layers 33, 34. In some embodiments, the plurality of first and second polymeric layers 33, 34 in the layer number range from about 91 to about 190 may form a second packet of the plurality of first and second polymeric layers 33, 34. In some embodiments, the plurality of first and second polymeric layers 33, 34 in the layer number range from about 191 to about 280 may form a third packet of the plurality of first and second polymeric layers 33, 34.

In some embodiments, a variation of the average thickness of the plurality of first and second polymeric layers 33, 34 with the layer number may be referred to as a layer thickness gradient of the reflective polarizer 30.

FIGS. 6A-6D illustrate exemplary schematic views of the reflective polarizer 30. In some embodiments, the reflective polarizer 30 is substantially planar. In some embodiments, the reflective polarizer 30 is curved. The reflective polarizer 30 includes a major surface 36. A normal 37 is defined perpendicular to the major surface 36 of the reflective polarizer 30. In some embodiments, the major surface 36 is substantially planar. For example, the major surface 36 may be disposed along the x-y plane. The normal 37 to the major surface 36 may extend along the z-axis. In some other embodiments, the major surface 36 may be curved. In such cases, the normal 37 at a given point on the major surface 36 is perpendicular to a tangent at the given point.

Referring to FIGS. 1, 2, 6A and 8, in some embodiments, for a first light 60 incident at a first predetermined angle $\theta 1$ from about 30 degrees to about 50 degrees with respect to the normal 37 to the major surface 36 of the reflective polarizer 30 and for the first polarization state, the reflective polarizer 30 reflects at least about 60% of the first light 60 for at least one same first wavelength 24 within the FWHM 32 of the at least one reflection band Rx and within the FWHM W of the at least one emission spectrum Ex. In some embodiments, for the first polarization state, the reflective polarizer 30 may reflect at least about 70%, at least about 75%, at least about 80%, or at least about 85% of the first light 60 for the at least one same first wavelength 24 within the FWHM 32 of the at least one reflection band Rx and within the FWHM W of the at least one emission spectrum Ex.

In some embodiments, the at least one reflection band Rx may be disposed in a green wavelength range extending from about 500 nm and about 570 nm. Further, the FWHM W may be disposed between about 510 nm and about 550 nm. The predetermined incident angle $\theta 1$ may be chosen based on desired application attributes. For example, the polarized image light 21 from the display panel 20 may be obliquely incident on the reflective polarizer 30 to allow an image light to reach the viewer 11. The at least one reflection band Rx of the reflective polarizer 30 may be further chosen based on the at least one emission spectrum Ex of the display panel 20. For the predetermined incident angle $\theta 1$, the at least one reflection band Rx may be substantially aligned with the at least one emission spectrum Ex. Specifically, the FWHM 32 of the at least one reflection band Rx may substantially overlap with the FWHM W of the at least one emission spectrum Ex.

In some embodiments, the first predetermined angle $\theta 1$ is from about 30 degrees to about 50 degrees. In some other embodiments, the first predetermined angle $\theta 1$ is from about 35 degrees to about 45 degrees. In some other embodiments, the first predetermined angle $\theta 1$ may be about 40 degrees. The first predetermined angle $\theta 1$ may correspond to an optimal or a design incident angle of the polarized image light 21 on the reflective polarizer 30.

In some embodiments, for the first light 60 incident at the first predetermined angle $\theta 1$ from about 30 degrees to about 50 degrees with respect to the normal 37 to the major surface 36 of the reflective polarizer 30 and for the first polarization state, the reflective polarizer 30 transmits at least about 50% of the first light 60 for at least one same second wavelength 25 outside the FWHM W of the at least one emission spectrum Ex and outside the FWHM 32 of the at least one reflection band Rx. In some embodiments, for the first polarization state, the reflective polarizer 30 may transmit at least about 60%, at least about 65%, at least about 70%, or at least about 75% of the first light 60 for the at least one same second wavelength 25 outside the FWHM W of the at least one emission spectrum Ex and outside the FWHM 32 of the at least one reflection band Rx.

In some embodiments, for the first light 60 incident at the first predetermined angle $\theta 1$ from about 30 degrees to about 50 degrees with respect to the normal 37 to the major surface 36 of the reflective polarizer 30 and for the orthogonal second polarization state, the reflective polarizer 30 transmits at least about 60% of the first light 60 for each wavelength in the FWHM W of the at least one emission spectrum Ex and the FWHM 32 of the at least one reflection band Rx. In some embodiments, for the orthogonal second polarization state, the reflective polarizer 30 may transmit at least about 70%, at least about 75%, at least about 80%, or at least about 85% of the first light 60 for each wavelength in the FWHM W of the at least one emission spectrum Ex and the FWHM 32 of the at least one reflection band Rx.

In some embodiments, for the first light 60 incident at the first predetermined angle $\theta 1$ from about 30 degrees to about 50 degrees with respect to the normal 37, an overlap between the FWHM W of the at least one emission spectrum Ex and the FWHM 32 of the at least one reflection band Rx is at least about 40% of the FWHM W of the at least one emission spectrum Ex. In some other embodiments, for the first light 60 incident at the first predetermined angle $\theta 1$ from about 30 degrees to about 50 degrees with respect to the normal 37, the overlap between the FWHM W of the at least one emission spectrum Ex and the FWHM 32 of the at least one reflection band Rx may be at least about 50%, at least about 55%, at least about 60%, or at least about 65% of the FWHM W of the at least one emission spectrum Ex. The overlap between the FWHM W of the at least one emission spectrum Ex and the FWHM 32 of the at least one reflection band Rx may ensure that the reflective polarizer 30 substantially reflects the polarized image light 21 from the display panel 20.

The reflective polarizer 30 may substantially reflect the first light 60 (e.g., at least 60% of the first light 60) for the first polarization state and for at least one same wavelength (e.g., the first wavelength 24) within the FWHM 32 of the at least one reflection band Rx and within the FWHM W of the at least one emission spectrum Ex. The reflective polarizer 30 may substantially transmit the first light 60 (e.g., at least 50% of the first light 60) for the first polarization state and for at least one other same wavelength (e.g., the second wavelength 25) outside the FWHM W of the at least one emission spectrum Ex and outside the FWHM 32 of the at least one reflection band Rx. Thus, for the first polarization state, the reflective polarizer 30 may substantially reflect the first light 60 only for each wavelength within the FWHM 32 at least one reflection band Rx, and substantially transmit the first light 60 for each wavelength outside the FWHM 32 at least one reflection band Rx. The overlap between the FWHM W of the at least one emission spectrum Ex and the FWHM 32 of the at least one reflection band Rx of the reflective polarizer 30 may therefore ensure that the reflective polarizer 30 substantially reflects the polarized image light 21 from the display panel 20, while substantially transmitting the first light 60 for one same wavelength outside the FWHM W of the at least one emission spectrum Ex and outside the FWHM 32 of the at least one reflection band Rx.

The reflective polarizer 30 may improve a thermal management of the display panel 20 while allowing optimal operation of the display system 300. Specifically, the reflective polarizer 30 may transmit a substantial portion of ambient light since the reflective polarizer 30 is substantially reflective in only the FWHM 32 of the at least one reflection band Rx for the first polarization state. This is contrast to conventional broadband polarizers that may reflect a substantial portion of ambient light toward an associated display panel, thereby causing undesirable heating and negatively impacting the thermal management of the associated display panel. Further, the reflective polarizer 30 may not interfere with an operation of the display system 300 since the reflective polarizer 30 substantially reflects the polarizer image light 21 having the at least one emission spectrum Ex from the display panel 20. In addition, the reflective polarizer 30 may substantially transmit the first light 60 (at least 60% of the first light 60) for the second polarization state, thereby further improving the thermal management of the display panel 20. In some embodiments, the display system 300 may further include a heat sink (not shown) that receives transmitted light from the reflective polarizer 30. In some embodiments, the reflective polarizer 30 may be substantially transmissive in an infrared wavelength range from about 800 nm to about 1500 nm irrespective of an incident angle and a polarization state of light incident on the reflective polarizer 30.

Referring to FIGS. 1, 2, 6A and 11, in some embodiments, for the first light 60 incident at the first predetermined angle θ1 from about 30 degrees to about 50 degrees with respect to the normal 37 and for the first polarization state, the reflective polarizer 30 reflects at least about 60% of the first light 60 for at least one same first wavelength 24b, 24g, 24r within each of the FWHMs 32b, 32g, 32r of the blue, green and red reflection bands Rb, Rg, Rr and within each of the respective FWHMs Wb, Wg, Wr of the blue, green and red emission spectra 22b, 22g, 22r. The first wavelengths 24b, 24g, 24r are within the FWHMs 32b, 32g, 32r of the blue, green and red reflection bands Rb, Rg, Rr, respectively. Further, the first wavelengths 24b, 24g, 24r are within the FWHMs Wb, Wg, Wr of the blue, green and red emission spectra 22b, 22g, 22r, respectively. In other words, the first wavelength 24b is within the FWHM 32b of the blue reflection band Rb as well as the FWHM Wb of the blue emission spectrum 22b. Similarly, the first wavelength 24g is within the FWHM 32g of the green reflection band Rg as well as the FWHM Wg of the green emission spectrum 32g. Further, the first wavelength 24r is within the FWHM 32r of the red reflection band Rr as well as the FWHM Wr of the red emission spectrum 32r.

Therefore, for the first polarization state, the reflective polarizer 30 may reflect at least 60% of the first light 60 for the at least one same first wavelength 24b within the blue FWHM 32b of the blue reflection band Rb and within the FWHM Wb of the blue emission spectrum 22b. For the first polarization state, the reflective polarizer 30 may further reflect at least about 60% of the first light 60 for the at least one same first wavelength 24g within the green FWHM 32g of the green reflection band Rg and within the FWHM Wg of the green emission spectrum 22g. For the first polarization state, the reflective polarizer 30 may further reflect at least about 60% of the first light 60 for the at least one same first wavelength 24r within the red FWHM 32r of the red reflection band Rr and within the FWHM Wr of the red emission spectrum 22r. In some embodiments, the reflective polarizer 30 may reflect at least about 70%, at least about 75%, at least about 80%, or at least about 85%, of the first light 60 for the at least one same first wavelength 24b, 24g, 24r within each of the FWHMs 32b, 32g, 32r of the blue, green and red reflection bands Rb, Rg, Rr and within each of the respective FWHMs Wb, Wg, Wr of the blue, green and red emission spectra 22b, 22g, 22r.

In some embodiments, for the first light 60 incident at the first predetermined angle θ1 from about 30 degrees to about 50 degrees with respect to the normal 37 to the major surface 36 of the reflective polarizer 30, the reflective polarizer 30 has an average total reflectance of greater than about 60% for the first polarization state across each of the blue, green and red FWHMs Wb, Wg, Wr.

In some embodiments, for the first light 60 incident at the first predetermined angle θ1 from about 30 degrees to about 50 degrees with respect to the normal 37 to the major surface 36 of the reflective polarizer 30 and for the first polarization state, the reflective polarizer 30 transmits at least about 50% of the first light 60 for at least one same second wavelength 25bg between the FWHMs 32b, 32g of the blue and green reflection bands Rb, Rg and between the FWHMs Wb, Wg of the blue and green emission spectra 22b, 22g, and for at least one same third wavelength 25gr between the FWHMs 32g, 32r of the green and red reflection bands Rg, Rr and between the FWHMs Wg, Wr of the green and red emission spectra 22g, 22r. The second wavelength 25bg is between the FWHMs 32b, 32g of the blue and green reflection bands Rb, Rg and also between the FWHMs Wb, Wg of the blue and green emission spectra 22b, 22g. The third wavelength 25gr is between the FWHMs 32g, 32r of the green and red reflection bands Rg, Rr and also between the FWHMs Wg, Wr of the green and red emission spectra 22g, 22r. In some other embodiments, for the first light 60 incident at the first predetermined angle θ1 and for the first polarization state, the reflective polarizer 30 may transmit at least about 60%, at least about 65%, at least about 70%, at least about 75%, or at least about 80% of the first light 60 for the at least one same second wavelength 25bg between the FWHMs 32b, 32g of the blue and green reflection bands Rb, Rg and between the FWHMs Wb, Wg of the blue and green emission spectra 22b, 22g, and for the at least one same third wavelength 25gr between the FWHMs 32g, 32r of the green and red reflection bands Rg, Rr and between the FWHMs Wg, Wr of the green and red emission spectra 22g, 22r.

In some embodiments, for the first light 60 incident at the first predetermined angle θ1 from about 30 degrees to about 50 degrees with respect to the normal 37 to the major surface 36 of the reflective polarizer 30, the reflective polarizer 30 has, for the first polarization state, a transmittance of at least about 50% for at least one wavelength (i.e., the second wavelength 25bg) between the FWHMs Wb, Wg of the blue and green emission spectra 22b, 22g, and for at least one other wavelength (i.e., the third wavelength 25gr) between the FWHMs Wg, Wr of the green and red emission spectra 22g, 22r. In some embodiments, for the first light 60 incident at the first predetermined angle θ1, the reflective polarizer 30 may have, for the first polarization state, the transmittance of at least about 55%, at least about 60%, or at least about 65% for the at least one wavelength 25bg between the FWHMs Wb, Wg of the blue and green emission spectra 22b, 22g, and for the at least one other wavelength 25gr between the FWHMs Wg, Wr of the green and red emission spectra 22g, 22r.

In some embodiments, for the first light 60 incident at the first predetermined angle θ1 from about 30 degrees to about 50 degrees with respect to the normal 37 and for the second polarization state, the reflective polarizer 30 transmits at least about 60% of the first light 60 for each wavelength in the FWHMs 32b, 32g, 32r of the blue, green and red reflection bands Rb, Rg, Rr, each wavelength in the FWHMs Wb, Wg, Wr of the blue, green and red emission spectra 22b, 22g, 22r, and each wavelength therebetween. In other words, the reflective polarizer 30 transmits at least about 60% of the first light 60 having the second polarization state for each wavelength in the FWHMs 32b, 32g, 32r of the blue, green and red reflection bands Rb, Rg, Rr, respectively, and also for each wavelength between the FWHMs 32b, 32g, 32r and each wavelength between the FWHMs 32b, 32g, 33r. In some embodiments, the reflective polarizer 30 further transmits at least about 60% of the first light 60 having the second polarization state for each wavelength in the FWHMs Wb, Wg, Wr of the blue, green and red emission spectra 22b, 22g, 22r, respectively, and also for each wavelength between the FWHMs Wb, Wg, Wr and each wavelength between the FWHMs Wb, Wg, Wr. In some embodiments, for the second polarization state, the reflective polarizer 30 may transmit at least about 60% of the first light 60 for each wavelength in a visible wavelength range from about 400 nm to about 700 nm.

In some embodiments, for the first light 60 incident at the first predetermined angle θ1 from about 30 degrees to about 50 degrees with respect to the normal 37 and for the second polarization state, the reflective polarizer 30 may transmit at least about 70%, at least about 75%, at least about 80%, or at least about 85% of the first light 60 for each wavelength in the FWHMs 32b, 32g, 32r of the blue, green, and red reflection bands Rb, Rg, Rr, each wavelength in the FWHMs Wb, Wg, Wr of the blue, green, and red emission spectra 22b, 22g, 22r, and each wavelength therebetween.

In some embodiments, for the first light 60 incident at the first predetermined angle θ1 from about 30 degrees to about 50 degrees with respect to the normal 37 and for the orthogonal second polarization state, the reflective polarizer 30 has an average total transmittance of greater than about 70% across the visible wavelength range including at least each of the blue, green, red FWHMs 32b, 32g, 32r.

In some embodiments, for the first light 60 incident at the first predetermined angle θ1 from about 30 degrees to about 50 degrees with respect to the normal 37, overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr are at least about 40% of the respective FWHMs Wb, Wg, Wr of the blue, green and red emission spectra 22b, 22g, 22r. In other words, for the first light 60 incident at the first predetermined angle θ1 from about 30 degrees to about 50 degrees with respect to the normal 37, the overlap between the FWHM Wb of the blue emission spectrum 22b and the FWHM 32b of the blue reflection band Rb is at least about 40% of the FWHM Wb. Similarly, for the first light 60 incident at the first predetermined angle θ1 from about 30 degrees to about 50 degrees with respect to the normal 37, the overlap between the FWHM Wg of the green emission spectrum 22g and the FWHM 32g of the green reflection band Rg is at least about 40% of the FWHM Wg. Further, for the first light 60 incident at the first predetermined angle θ1 from about 30 degrees to about 50 degrees with respect to the normal 37, the overlap between the FWHM Wr of the red emission spectrum 22r and the FWHM 32r of the red reflection band Rr is at least about 40% of the FWHM Wr. The overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr may ensure that the reflective polarizer 30 substantially reflects the polarized image light 21 from the display panel 20.

In some other embodiments, for the first light 60 incident at the first predetermined angle θ1 from about 30 degrees to about 50 degrees with respect to the normal 37, the overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr may be at least about 50%, at least about 55%, at least about 60%, or at least about 65% of the respective FWHMs Wb, Wg, Wr of the blue, green and red emission spectra 22b, 22g, 22r.

The reflective polarizer 30 may substantially reflect the first light 60 (e.g., at least 60% of the first light 60) for the first polarization state and for at least one same wavelength (i.e., the first wavelength 24b) within each of the FWHMs 32b, 32g, 32r of the blue, green and red reflection bands Rb, Rg, Rr and within each of the respective FWHMs Wb, Wg, Wr of the blue, green and red emission spectra 22b, 22g, 22r. The reflective polarizer 30 may substantially transmit the first light 60 (e.g., at least 50% of the first light 60) for the first polarization state and for each wavelength between the FWHMs 32b, 32g of the blue and green reflection bands Rb, Rg, and also for each wavelength between the FWHMs Wb, Wg of the blue and green emission spectra 22b, 22g. The reflective polarizer 30 may further substantially transmit the first light 60 (e.g., at least 50% of the first light 60) for the first polarization state and for each wavelength between the FWHMs 32g, 32r of the green and red reflection bands Rg, Rr, and also for each wavelength between the FWHMs Wg, Wr of the green and red emission spectra 22g, 22r.

Thus, for the first polarization state, the reflective polarizer 30 may substantially reflect the first light 60 only for each wavelength within the FWHMs 32b, 32g, 32r of the blue, green and red reflection bands Rb, Rg, Rr, and substantially transmit the first light 60 for each wavelength between the FWHMs 32b, 32g of the blue and green reflection bands Rb, Rg and for each wavelength between the FWHMs 32g, 32r of the green and red reflection bands Rg, Rr. The overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr of the reflective polarizer 30 may therefore ensure that the polarized image light 21 from the display panel 20 is substantially reflected. Further, the overlaps may ensure that the first light 60 for one same wavelength between the FWHMs Wb, Wg, of the blue and green emission spectra 22b, 22g and the FWHMs 32b, 32g of the blue and green reflection bands Rb, Rg is substantially transmitted. Further, the first light 60 for one same wavelength between the FWHMs Wg, Wr, of the green and red emission spectra 22g, 22r and the FWHMs 32g, 32r of the green and red reflection bands Rg, Rr, is substantially transmitted.

The reflective polarizer 30 may improve a thermal management of the display panel 20 while allowing optimal operation of the display system 300. Specifically, the reflective polarizer 30 may transmit a substantial portion of ambient light since the reflective polarizer 30 is substantially reflective only for each wavelength within the FWHMs 32b, 32g, 32r of the blue, green and red reflection bands Rb, Rg, Rr for the first polarization state. In addition, the reflective polarizer 30 may substantially transmit the first light 60 (at least 60% of the first light 60) for the second polarization state, thereby further improving the thermal management of the display panel 20.

Figure 9:
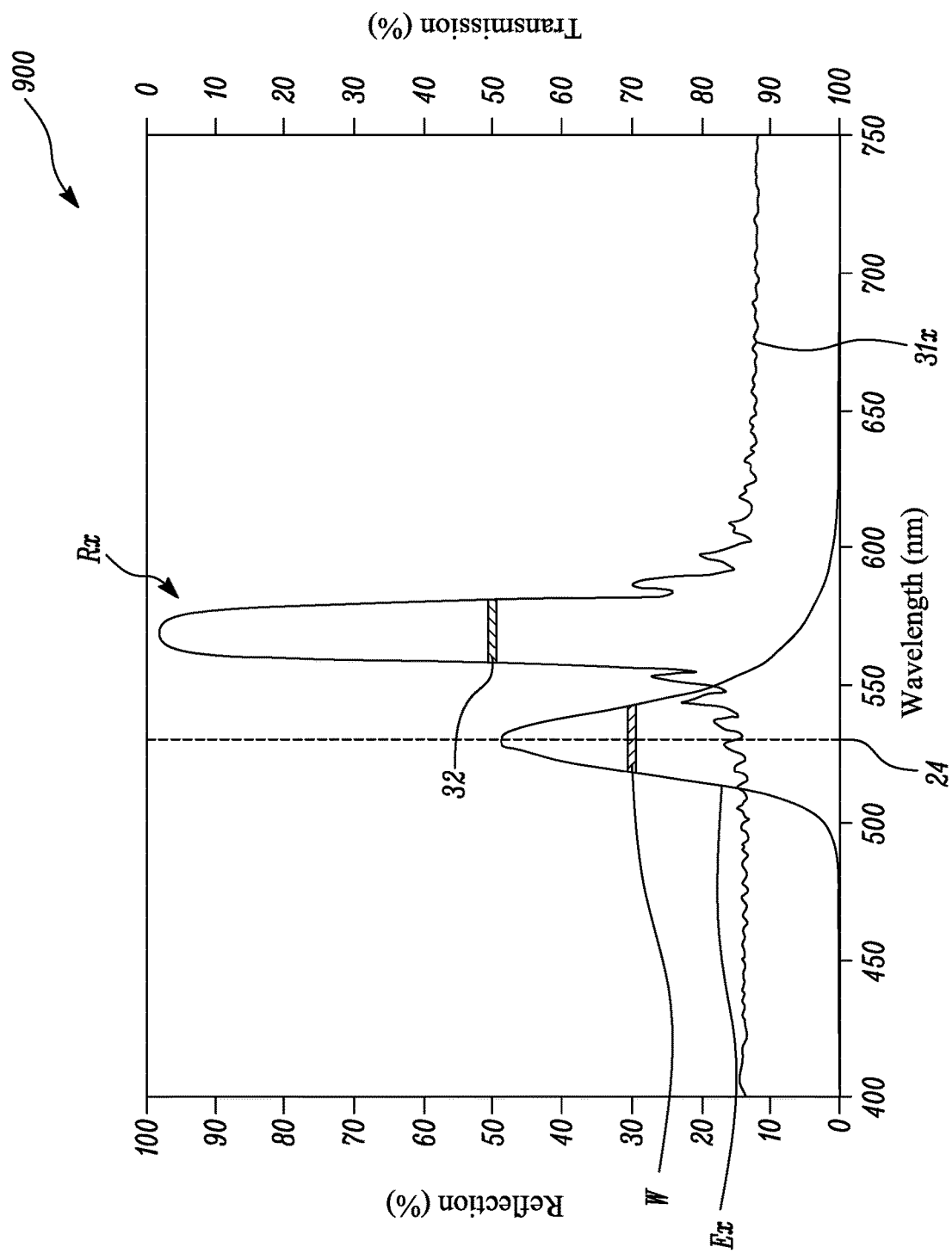

Referring to FIGS. 2, 6B, and 9, in some embodiments, for a second light 61 incident at a second predetermined angle θ2 less than about 30 degrees with respect to the normal 37 to the major surface 36 of the reflective polarizer 30, and for each of the first and second polarization states, the reflective polarizer 30 transmits at least about 50% of the second light 61 for the at least first wavelength 24. Specifically, for the second light 61 incident at the second predetermined angle θ2 less than about 30 degrees with respect to the normal 37 to the major surface 36 of the reflective polarizer 30, and for each of the first and second polarization states, the reflective polarizer 30 transmits at least about 50% of the second light 61 for the at least one same first wavelength 24 within the FWHM 32 of the at least one reflection band Rx and within the FWHM W of the at least one emission spectrum Ex. In some embodiments, for each of the first and second polarization states, the reflective polarizer 30 may transmit at least about 60%, at least about 65%, at least about 70%, or at least about 75% of the second light 61 for the at least first wavelength 24.

In some embodiments, for the second light 61 incident at the second predetermined angle θ2 less than about 30 degrees with respect to the normal 37, the FWHM W of the at least one emission spectrum Ex and the FWHM 32 of the at least one reflection band Rx do not overlap. Therefore, for the second light 61 incident at the second predetermined angle θ2 less than about 30 degrees with respect to the normal 37 and for each of the first and second polarization states, the reflective polarizer 30 may substantially transmit light for each wavelength in the FWHM W of the at least one emission spectrum Ex.

The reflective polarizer 30 may substantially transmit the second light 61 (e.g., at least 50% of the second light 61) for the first and second polarization states and for at least one wavelength within the FWHM W of the at least one emission spectrum Ex. This may ensure that a substantial portion of any stray light, such as the second light 61, that is not used for generating the virtual image 12, is transmitted by the reflective polarizer 30 and may not be received by the display panel 20. The reflective polarizer 30 may only be substantially reflective within the FWHM 32 of the at least one reflection band Rx. Any light that is incident on the reflective polarizer 30 at an angle outside an acceptable range may be stray light not emitted by the display panel 20. The acceptable range of incident angle may be defined with respect to the first predetermined angle θ1 (shown in FIG. 6A). Stray light may be ambient light originating from any external source. The reflective polarizer 30 may ensure that a substantial portion of such stray light is not reflected toward the display panel 20. The reflective polarizer 30 may also be ensure that one or more wavelengths of stray light that lie within the FWHM W of the at least one emission spectrum Ex of the display panel 20 are not reflected toward the display panel 20. The reflective polarizer 30 may therefore perform spatial filtering of incident light in addition to spectral filtering, thereby further improving the thermal management of the display panel 20.

Figure 12:
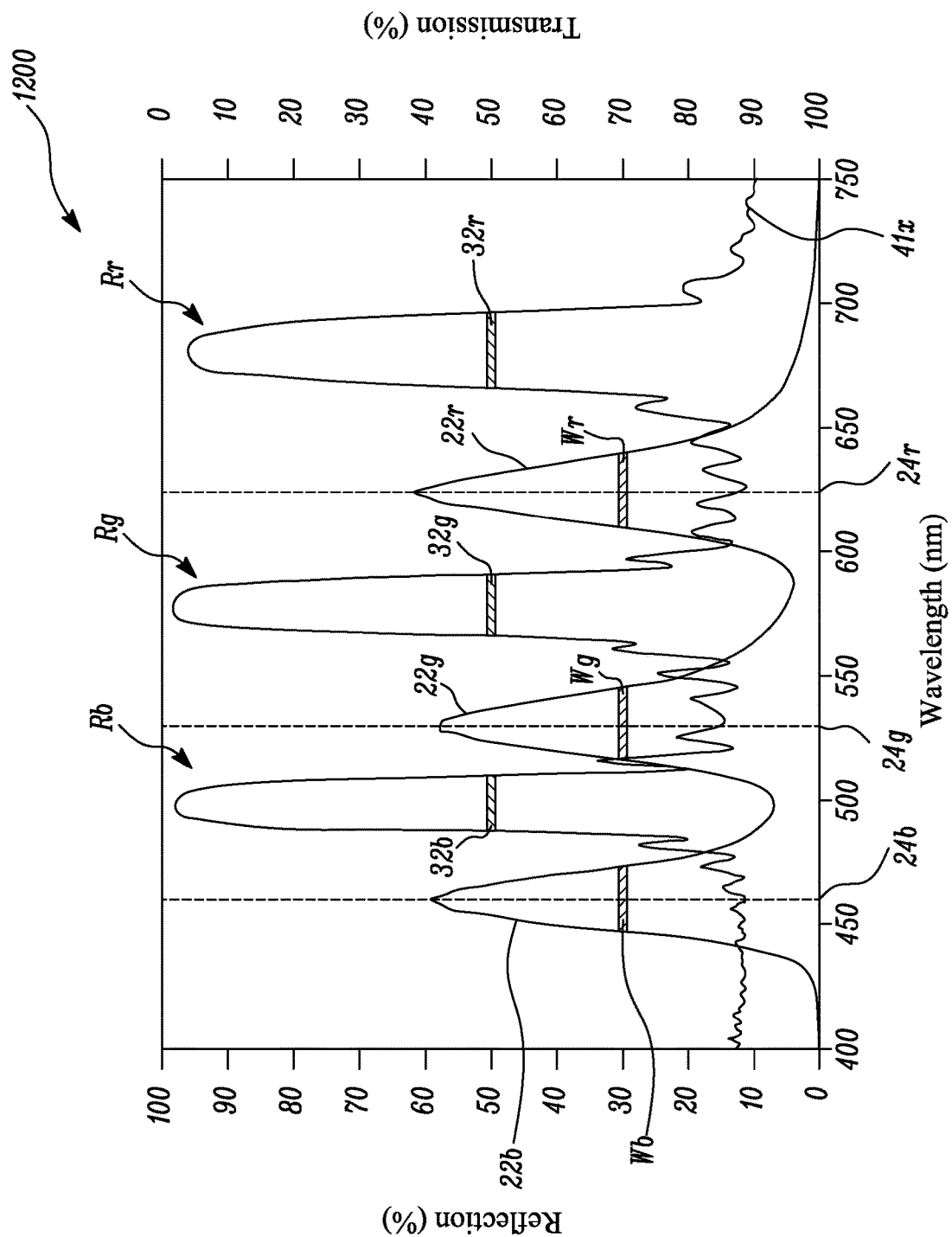

Referring to FIGS. 2, 6B, and 12, in some embodiments, for the second light 61 incident at the second predetermined angle θ2 less than about 30 degrees with respect to the normal 37 to the major surface 36 of the reflective polarizer 30, and for each of the first and second polarization states, the reflective polarizer 30 transmits at least about 50% of the second light 61 for the at least first wavelength 24b, 24g, 24r. Specifically, for the second light 61 incident at the second predetermined angle θ2 less than about 30 degrees with respect to the normal 37 to the major surface 36 of the reflective polarizer 30, the reflective polarizer 30 transmits at least about 50% of the second light 61 for the at least one same first wavelength 24b, 24g, 24r within each of the FWHMs 32b, 32g, 32r of the blue, green and red reflection bands Rb, Rg, Rr and within each of the respective FWHMs Wb, Wg, Wr of the blue, green and red emission spectra 22b, 22g, 22r. In some embodiments, for each of the first and second polarization states, the reflective polarizer 30 may transmit at least about 60%, at least about 65%, at least about 70%, or at least about 75% of the second light 61 for the at least first wavelength 24b, 24g, 24r.

In some embodiments, for the second light 61 incident at the second predetermined angle θ2 less than about 30 degrees with respect to the normal 37 to the major surface 36 of the reflective polarizer 30, and for each of the first and second polarization states, the reflective polarizer 30 has an average total transmittance of at least about 50% across each of the blue, green and red FWHMs Wb, Wg, Wr.

The reflective polarizer 30 may substantially transmit the second light 61 (e.g., at least 50% of the second light 61) for the first and second polarization states and for at least one same wavelength within each of the FWHMs 32b, 32g, 32r of the blue, green and red reflection bands Rb, Rg, Rr and within each of the respective FWHMs Wb, Wg, Wr of the blue, green and red emission spectra 22b, 22g, 22r. This may ensure that any stray light, such as the second light 61, that is not used for generating the virtual image 12, is transmitted by the reflective polarizer 30 and may not be received by the display panel 20. Thus, the reflective polarizer 30 may further improve the thermal management of the display panel 20.

Referring to FIGS. 1, 2, 6A, 6C, and 10, in some embodiments, for a third light 62 incident at an angle θ3 that deviates from the first predetermined angle θ1 by at most about 5 degrees, a change in the overlap between the FWHM W of the at least one emission spectrum Ex and the FWHM 32 of the at least one reflective band Rx is from about 5% to about 50%. In some embodiments, the change in the overlap between the FWHM W of the at least one emission spectrum Ex and the FWHM 32 of the at least one reflective band Rx may be from about 10% to about 45%, from about 15% to about 40%, from about 20% to about 35%, or from about 15% to about 30%. Therefore, the FWHM W of the at least one emission spectrum Ex at least partially overlaps with the FWHM 32 of the at least one reflection band Rx for an acceptable deviation (e.g., at most about 5 degrees) of an incident angle of light from the first predetermined angle θ1. In other words, the at least one reflective band Rx of the reflective polarizer 30 may be at least partially aligned with the at least one emission spectra Ex of the display panel 20 of the display system 300 for the acceptable deviation of the incident angle from the first predetermined angle θ1. The reflective polarizer 30 may therefore be substantially reflective for the acceptable deviation of the incident angle, while being substantially transmissive for incident angles having large deviation from the first predetermined angle θ1. Consequently, the reflective polarizer 30 may substantially reflect the polarized image light 21 even for acceptable deviations. Thus, an operation of the display system 300 may not be substantially impacted for such acceptable deviations from the first predetermined angle θ1. Further, the reflective polarizer 30 may continue to be substantially transmissive for wavelengths outside the at least one reflective band Rx.

Referring to FIGS. 1, 2, 6A, 6C, and 13, in some embodiments, for the third light 62 incident on the reflective polarizer 30 at the angle θ3 that deviates from the first predetermined angle θ1 by at most about 5 degrees, a change in each of the overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr is from about 5% to about 50%. In some embodiments, the change in each of the overlaps between the FWHMs Wb, Wg, Wr of the blue, green and red emission spectra 22b, 22g, 22r and the respective FWHMs 32b, 32g, 32r of the blue, green and red reflective bands Rb, Rg, Rr may be from about 10% to about 45%, from about 15% to about 40%, from about 20% to about 35%, or from about 15% to about 30%.

Therefore, the FWHMs Wb, Wg, Wr of the blue, green and red emission spectra 22b, 22g, 22r at least partially overlap the FWHMs 32b, 32g, 32r of the blue, green and red reflective bands Rb, Rg, Rr, respectively, for the acceptable deviation (e.g., at most about 5 degrees) of the incident angle of light from the first predetermined angle θ1. In other words, the blue, green, and red reflective bands Rb, Rg, Rr of the reflective polarizer 30 may be partially aligned with the blue, green and red emission spectra 22b, 22g, 22r of the display panel 20 of the display system 300 for the acceptable deviation of the incident angle from the first predetermined angle θ1. Thus, an operation of the display system 300 may not be substantially impacted for such acceptable deviations from the first predetermined angle θ1. Further, the reflective polarizer 30 may continue to be substantially transmissive for wavelengths outside the blue, green and red reflective bands Rb, Rg, Rr.

FIG. 6D illustrates a schematic view of the reflective polarizer 30 and a light 63 incident at an angle θ4 according to an embodiment of the present disclosure. The angle θ4 deviates from the first predetermined angle θ1 by at most about 10 degrees.

FIG. 6E illustrates a schematic view of the mirror 40. In some embodiments, the mirror 40 is planar. In some other embodiments, the mirror 40 is curved. FIG. 6E further illustrates an incident light 64 incident at an angle θ5 with respect to a normal 38 to the mirror 40 according to an embodiment of the present disclosure. In some embodiments, the mirror 40 may be curved. In such cases, the normal 38 at a given point on the mirror 40 is perpendicular to a tangent at the given point.

In the illustrated embodiment of FIG. 6E, the angle θ5 is an oblique angle with respect to the normal 38 to the mirror 40. However, in some other embodiments, the angle θ5 between the incident light 64 and the normal 38 may be substantially zero. In other words, the incident light 64 may be normally incident on the mirror 40.

Referring to FIGS. 2, 6E and 8, in some embodiments, for at least the first polarization state, the mirror 40 reflects at least about 70% of the incident light 64 for each wavelength in the FWHM W of the at least one emission spectrum Ex. In some embodiments, for at least the first polarization state, the mirror 40 may reflect at least about 80%, at least about 85%, at least about 90%, or at least about 95% of the incident light 64 for each wavelength in the FWHM W of the at least one emission spectrum Ex. In some embodiments, for each of the first and second polarization states, the mirror 40 reflects at least about 70% of the incident light 64 for each wavelength in the FWHM W of the at least one emission spectrum Ex.

Referring to FIGS. 2, 6E, and 11, in some embodiments, for at least the first polarization state, the mirror 40 reflects at least about 70% of the incident light 64 for each wavelength in the FWHMs Wb, Wg, Wr of the blue, green and red emission spectra 22b, 22g, 22r. In other words, for at least the first polarization state, the mirror 40 reflects at least about 70% of the incident light 64 for each wavelength in the blue FWHM Wb, the green FWHM Wg, and the red FWHM Wr.

In some embodiments, for at least the first polarization state, the mirror 40 may reflect at least about 80%, at least about 85%, at least about 90%, or at least about 95% of the incident light 64 for each wavelength in the FWHMs Wb, Wg, Wr of the blue, green and red emission spectra 22b, 22g, 22r.

In some embodiments, for each of the first and second polarization states, the mirror 40 reflects at least about 70% of the incident light 64 for each wavelength in the FWHMs 32b, 32g, 32r of the blue, green and red reflection bands Rb, Rg, Rr, each wavelength in the FWHMs Wb, Wg, Wr of the blue, green and red emission spectra 22b, 22g, 22r, and each wavelength therebetween. In other words, for each of the first and second polarization states, the mirror 40 reflects at least about 70% of the incident light 64 for each wavelength in the FWHMs 32b, 32g, 32r of the blue, green and red reflection bands Rb, Rg, Rr, respectively, and also for each wavelength between the FWHMs 32b, 32g and for each wavelength between the FWHMs 32g, 32r. For each of the first and second polarization states, the mirror 40 further reflects at least 70% of the incident light 64 for each wavelength in the FWHMs Wb, Wg, Wr of the blue, green and red emission spectra 22b, 22g, 22r, respectively, and also for each wavelength between the FWHMs Wb, Wg and for each wavelength between the FWHMs Wg, Wr.

In some embodiments, for each of the first and second polarization states, the mirror 40 may reflect at least about 70% of the incident light 64 for each wavelength in the visible wavelength range from about 400 nm to about 700 nm. The mirror 40 may be substantially reflective for each wavelength in the visible spectrum irrespective of a polarization state and an incident angle of an incident light.

Figure 7B:
FIG. 7B illustrates a schematic view of a mirror of the display system, according to another embodiment of the present disclosure.
Figure 7A:
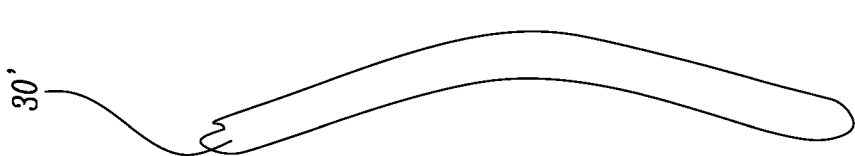
FIG. 7A illustrates a schematic view of a reflective polarizer of the display system, according to another embodiment of the present disclosure.

FIG. 7A illustrates a schematic view of a curved reflective polarizer 30'. The curved reflective polarizer 30' may be concave. In some other embodiments, the curved reflective polarizer 30' may be convex.

FIG. 7B illustrates a schematic view of a curved mirror 40'. The curved mirror 40' may be concave. In some other embodiments, the curved mirror 40' may be convex.

In some embodiments, the display system 300 (shown in FIG. 2) includes at least one of the curved reflective polarizer 30' and the curved mirror 40'. In some embodiments, the display system 300 includes the curved reflective polarizer 30'. In another embodiment, the display system 300 includes the curved mirror 40'. In some other examples, the display system 300 includes both the curved reflective polarizer 30' and the curved mirror 40'.

Figure 10:
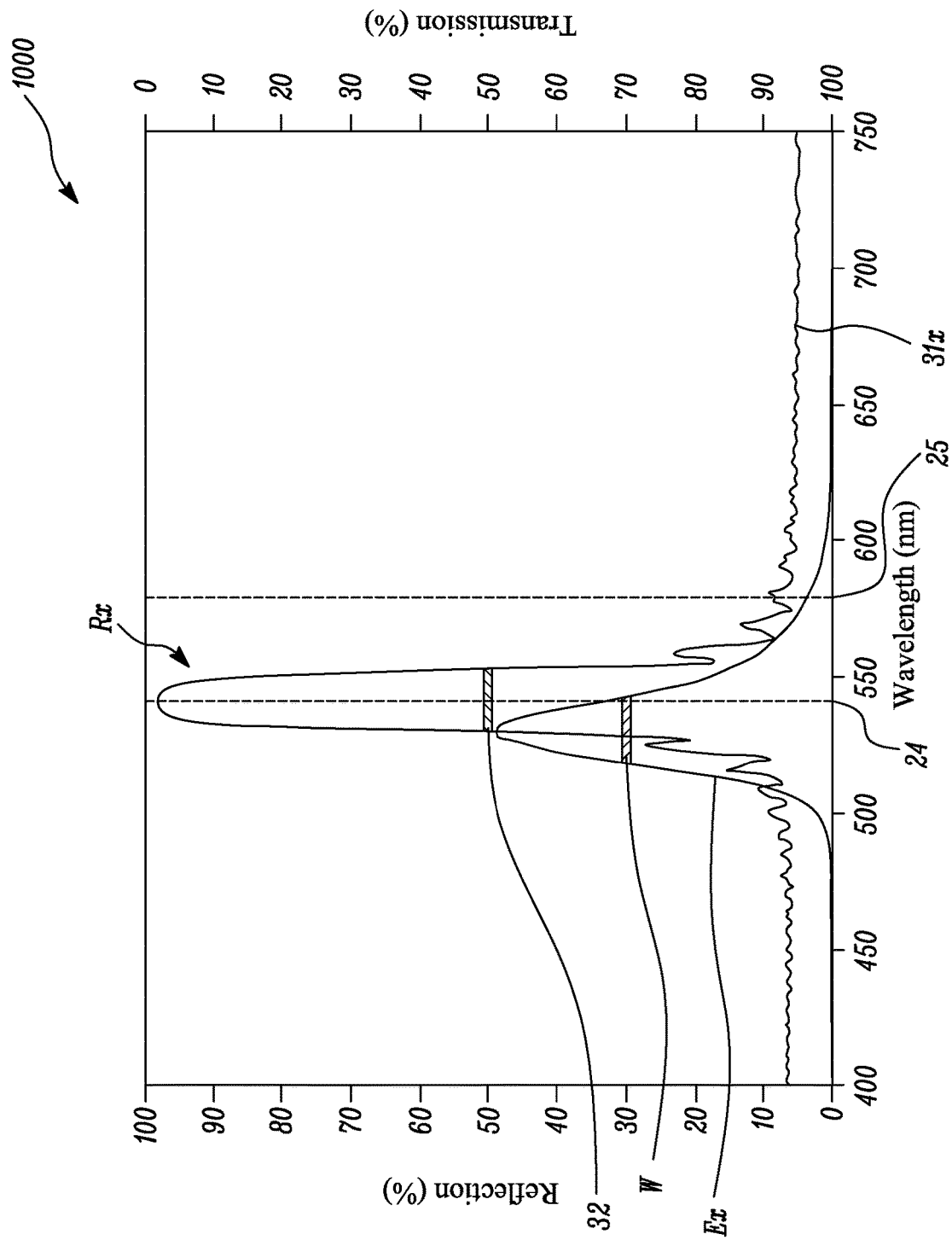

FIGS. 8, 9 and 10 illustrate graphs 800, 900, 1000, respectively, depicting reflection characteristics of the reflective polarizer 30 for various incident angles. The plot 800 shows the reflection characteristics of the reflective polarizer 30 for the first light 60 (shown in FIG. 6A) incident at the first predetermined angle $\theta 1$ with respect to the normal 37. The plot 900 shows the reflection characteristics of the reflective polarizer 30 for the second light 61 (shown in FIG. 6B) incident at the second predetermined angle $\theta 2$ with respect to the normal 37. The plot 1000 shows the reflection characteristics of the reflective polarizer 30 for the third light 61 (shown in FIG. 6C) incident at the angle $\theta 3$ with respect to the normal 37. Wavelength is expressed in nanometers (nm) in the abscissa. The reflection is expressed as reflection percentage in the left ordinate. Transmission is expressed as transmission percentage in the right ordinate. The transmission percentage is complementary to the reflection percentage, i.e., transmission percentage=(100−reflection percentage). The graphs 800, 900, 1000 illustrate the reflection spectrum 31x of the reflective polarizer 30 for the first polarization state. The graph 800 illustrates the reflection spectrum 31y of the reflective polarizer 30 for the second polarization state. The reflection spectrum 31y is not shown in the graphs 900, 1000 for the purpose of clarity. The reflection spectrum 31x includes the at least one reflection band Rx having the FWHM 32.

The graphs 800, 900, 1000 further illustrate the at least one emission spectrum Ex having the FWHM W of the polarized image light 21 emitted by the display panel 20 (shown in FIG. 2). Any suitable energy unit may be used to illustrate the emission spectrum of the display panel 20 in the graphs 800, 900, 1000.

The graphs 800, 1000 further illustrate the first wavelength 24 and the second wavelength 25. The first wavelength 24 is within the FWHM 32 of the at least one reflection band Rx and also within the FWHM W of the at least one emission spectrum Ex. The second wavelength 25 is outside the FWHM W of the at least one emission spectrum Ex and also outside the FWHM 32 of the at least one reflection band Rx.

The reflection characteristics of the reflective polarizer 30, as shown in the graph 800 in FIG. 8, may correspond to a design incident angle (i.e., the first predetermined angle $\theta 1$) of the polarized image light 21. The reflection spectrum 31x for the first polarization state may correspond to a reflection or blocking axis of the reflective polarizer 30. The reflection spectrum 31x includes the at least one reflection band Rx. For the first polarization state, the reflective polarizer 30 may be substantially reflective for at least one wavelength within the FWHM 32 of the at least one reflection band Rx, but substantially transmissive for at least one wavelength outside the FWHM 32 of the at least one reflection band Rx. The reflection spectrum 31y for the second polarization state may correspond to a transmission axis of the reflective polarizer 30. The reflective polarizer 30 may be substantially transmissive for the second polarization state in the visible wavelength range, as indicated by the reflection spectrum 31y. In some embodiments, the reflection spectrum 31y for the second polarization state may not substantially change with incident angle.

As shown in the graph 800, the FWHM W of the at least one emission spectrum Ex overlaps with the FWHM 32 of the at least one reflection band Rx. In some embodiments, the overlap between the FWHM W of the at least one emission spectrum Ex and the FWHM 32 of the at least one reflection band Rx is about 80% of the FWHM of the at least one emission spectrum. Therefore, the at least one reflective band Rx of the reflective polarizer 30 may be substantially aligned with the at least one emission spectra Ex of the display panel 20 of the display system 300 (shown in FIG. 2) for the first light 60 incident at the first predetermined angle $\theta 1$ from about 30 degrees to about 50 degrees with respect to the normal 37 (shown in FIG. 6A). Therefore, the reflective polarizer 30 may substantially reflect the first light 60 in the wavelength ranges and polarization state emitted by the display panel 20. Further, for the first polarization state, the reflective polarizer 30 may only substantially reflect the first light 60 for each wavelength in the FWHM 32 of at least one reflection band Rx toward the display panel 20. This may further improve the thermal management of the display panel 20.

As shown in the graph 900 of FIG. 9, the reflection spectrum 31x shifts when the incident angle is the second predetermined angle $\theta 2$. The second predetermined angle $\theta 2$ is less than the first predetermined angle $\theta 1$. With a decrease in the incident angle from the design incident angle (i.e., the first predetermined angle $\theta 1$), the reflective spectrum 31x including the at least one reflective band Rx may shift toward a red end of the visible spectrum. As shown in the graph 900, the FWHM W of the at least one emission spectrum Ex and the FWHM 32 of the at least one reflective band Rx do not overlap. Therefore, the at least one reflective band Rx of the reflective polarizer 30 is not aligned with the at least one emission spectra Ex of the display panel 20 of the display system 300 (shown in FIG. 2) for the second light 61 incident at the second predetermined angle $\theta 2$ less than about 30 degrees with respect to the normal 37 (shown in FIG. 6B).

This may ensure that a substantial portion of any stray light, such as the second light 61, that is not used for generating the virtual image 12, is transmitted by the reflective polarizer 30 and may not be received by the display panel 20. Thus, the reflective polarizer 30 may further improve the thermal management of the display panel 20.

As shown in the graph 1000 of FIG. 10, the reflection spectrum 31x shifts when the incident angle is the angle $\theta 3$. The angle $\theta 3$ may be less than the first predetermined angle $\theta 1$, but within an acceptable deviation. With a decrease in the incident angle from the design incident angle (i.e., the first predetermined angle $\theta 1$), the reflective spectrum 31x including the at least one reflective band Rx may shift toward a red end of the visible spectrum. As shown in the graph 1000, the FWHM W of the at least one emission spectrum Ex partially overlaps with the FWHM 32 of the at least one reflection band Rx. In some embodiments, the overlap is about 60% of the FWHM W of the at least one emission spectrum Ex. Therefore, the at least one reflective band Rx of the reflective polarizer 30 may be partially aligned with the at least one emission spectra Ex of the display panel 20 of the display system 300 (shown in FIG. 2) for the third light 62 incident at the angle $\theta 3$ that deviates from the first predetermined angle $\theta 1$ by at most about 5 degrees (shown in FIG. 6C). This may allow normal operation of the display panel 20 in case of acceptable deviations from the first predetermined angle θ1.

Referring to FIGS. 8-10, the reflection spectrum 31x for the first polarization state may shift based on different angles of incidence. For example, the reflective spectrum 31x may shift toward the blue end or red end of the spectrum from a position corresponding to the first predetermined angle θ1.

Figure 13:
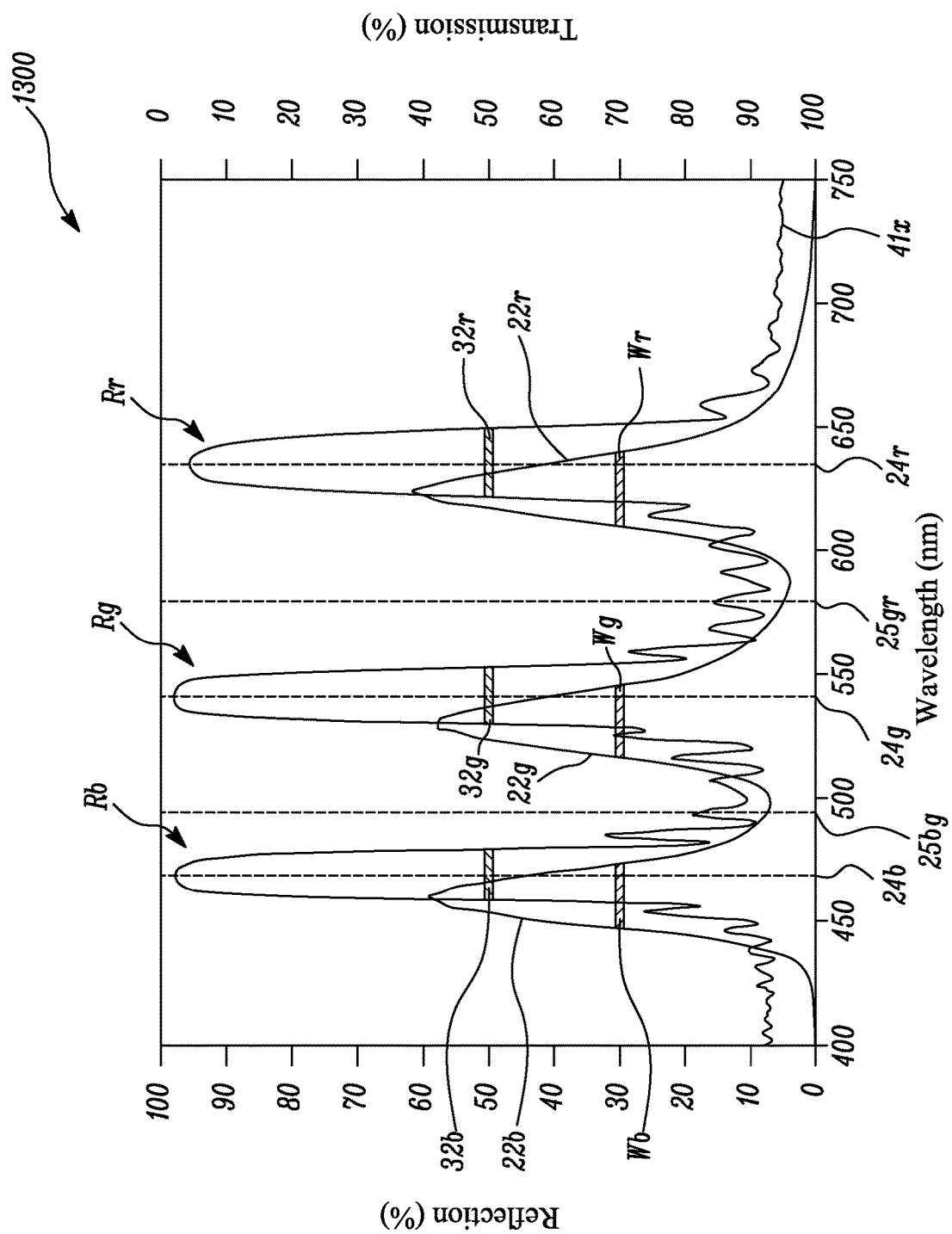

FIGS. 11, 12 and 13 illustrate graphs 1100, 1200, 1300, respectively, depicting reflection characteristics of the reflective polarizer 30 for various incident angles. The plot 1100 shows the reflection characteristics of the reflective polarizer 30 for the first light 60 (shown in FIG. 6A) incident at the first predetermined angle θ1 with respect to the normal 37. The plot 1200 shows the reflection characteristics of the reflective polarizer 30 for the second light 61 (shown in FIG. 6B) incident at the second predetermined angle θ2 with respect to the normal 37. The plot 1300 shows the reflection characteristics of the reflective polarizer 30 for the third light 63 (shown in FIG. 6C) incident at the angle θ3 with respect to the normal 37. Wavelength is expressed in nanometers (nm) in the abscissa. The reflection is expressed as reflection percentage in the left ordinate. Transmission is expressed as transmission percentage in the right ordinate. The transmission percentage is complementary to the reflection percentage, i.e., transmission percentage=(100−reflection percentage). The graphs 1100, 1200, 1300 illustrate the reflection spectrum 41x of the reflective polarizer 30 for the first polarization state. The graph 1100 illustrates the reflection spectrum 41y of the reflective polarizer 30 for the second polarization state. The reflection spectrum 41y is not shown in the graphs 1200, 1300 for the purpose of clarity. The reflection spectrum 41x includes the blue reflection band Rb, the green reflection band Rg, and the red reflection band Rr having the respective blue FWHM 32b, green FWHM 32g, and red FWHM 32r.

The graphs 1100, 1200, 1300 further illustrate the blue emission spectrum 22b, the green emission spectrum 22g, and the red emission spectrum 22r having the respective blue FWHM Wb, green FWHM Wg, and red FWHM Wr of the polarized image light 21 emitted by the display panel 20 (shown in FIG. 2). Any suitable energy unit may be used to illustrate the emission spectrum of the display panel 20 in the graphs 1100, 1200, 1300.

The graphs 1100, 1300 illustrate the first wavelength 24b within the blue FWHM 32b of the blue reflection band Rb, the first wavelength 24g within the green FWHM 32g of the green reflection band Rg, and the first wavelength 24r within the red FWHM 32r of the red reflection band Rr. The first wavelength 24b is also within the blue FWHM Wb of the blue emission band 22b, the first wavelength 24g is also within the green FWHM Wg of the green emission band 22g, and the first wavelength 24r is also within the red FWHM Wr of the red emission band 22r.

The graphs 1100, 1300 further illustrate the second wavelength 25bg and the third wavelength 25gr. As shown in FIGS. 11 and 13, the second wavelength 25bg is between the FWHMs 32b, 32g of the blue and green reflection bands Rb, Rg and also between the FWHMs Wb, Wg of the blue and green emission spectra 22b, 22g. The third wavelength 25gr is between the FWHMs 32g, 32r of the green and red reflection bands Rg, Rr and also between the FWHMs Wg, Wr of the green and red emission spectra 22g, 22r.

The reflection characteristics of the reflective polarizer 30, as shown in the graph 1100 in FIG. 11, may correspond to a design incident angle (i.e., the first predetermined angle θ1) of the polarized image light 21. The reflection spectrum 41x for the first polarization state may correspond to a reflection or blocking axis of the reflective polarizer 30. The reflection spectrum 41x includes the blue, green and red reflection bands Rb, Rg, Rr. For the first polarization state, the reflective polarizer 30 may be substantially reflective for at least one wavelength within the FWHMs 32b, 32g, 32r of each of the blue, green and red reflection band Rb, Rg, Rr, but substantially transmissive between the FWHMs 32b, 32g, of the blue and green reflection bands Rb, Rg and between the FWHMs 32g, 32r, of the green and red reflection bands Rg, Rr. The reflection spectrum 41y for the second polarization state may correspond to a transmission axis of the reflective polarizer 30. The reflective polarizer 30 may be substantially transmissive for the second polarization state in the visible wavelength range, as indicated by the reflection spectrum 41y. In some embodiments, the reflection spectrum 41y for the second polarization state may not substantially change with incident angle.

As shown in the graph 1100, the FWHMs Wb, Wg, Wr of the blue, green and red emission spectra 22b, 22g, 22r overlap the respective FWHMs 32b, 32g, 32r of the blue, green and red reflective bands Rb, Rg, Rr. In some embodiments, the overlaps between the FWHMs Wb, Wg, Wr of the blue, green and red emission spectra 22b, 22g, 22r and the FWHMs 32b, 32g, 32r of the blue, green and red reflective bands Rb, Rg, Rr are about 80% of the FWHMs Wb, Wg, Wr of the blue, green and red emission spectra 22b, 22g, 22r, respectively. Therefore, the blue, green, and red reflective bands Rb, Rg, Rr of the reflective polarizer 30 may be substantially aligned with the blue, green, and red emission spectra 22b, 22g, 22r, respectively, of the display panel 20 of the display system 300 (shown in FIG. 2) for the first light 60 incident at the first predetermined angle θ1 from about 30 degrees to about 50 degrees with respect to the normal 37 (shown in FIG. 6A).

Therefore, the reflective polarizer 30 may substantially reflect the first light 60 in the wavelength ranges and polarization state emitted by the display panel 20. Further, for the first polarization state, the reflective polarizer 30 may only substantially reflect the first light 60 for each wavelength in the FWHMs 32b, 32g, 32r of the respective blue, green and red reflective bands Rb, Rg, Rr toward the display panel 20. This may further improve the thermal management of the display panel 20.

As shown in the graph 1200, the FWHMs Wb, Wg, Wr of the blue, green and red emission spectra 22b, 22g, 22r and the FWHMs 32b, 32g, 32r of the blue, green and red reflective bands Rb, Rg, Rr do not overlap. Therefore, the blue, green and red reflective bands Rb, Rg, Rr of the reflective polarizer 30 are not aligned with the respective blue, green and red emission spectra 22b, 22g, 22r of the display panel 20 of the display system 300 (shown in FIG. 2) for the second light 61 incident at the second predetermined angle θ2 less than about 30 degrees with respect to the normal 37 (shown in FIG. 6B).

This may ensure that a substantial portion of any stray light, such as the second light 61, that is not used for generating the virtual image 12, is transmitted by the reflective polarizer 30 and may not be received by the display panel 20. Thus, the reflective polarizer 30 may further improve the thermal management of the display panel 20.

As shown in the graph 1300 of FIG. 13, the reflection spectrum 41x shifts when the incident angle is the angle θ3. The angle θ3 may be less than the first predetermined angle θ1, but within an acceptable deviation. With a decrease in the incident angle from the design incident angle (i.e., the first predetermined angle θ1), the reflective spectrum 41x including the blue, green and red reflective bands Wb, Wg, Wr may shift toward a red end of the visible spectrum. The FWHMs Wb, Wg, Wr of the blue, green and red emission spectra 22b, 22g, 22r partially overlap with the FWHMs 32b, 32g, 32r of the blue, green and red reflective bands Rb, Rg, Rr, respectively. In some embodiments, the overlaps are about 50% of the respective FWHMs Wb, Wg, Wr of the blue, green and red emission spectra 22b, 22g, 22r. Therefore, the blue, green, and red reflective bands Rb, Rg, Rr of the reflective polarizer 30 may be partially aligned with the blue, green and red emission spectra 22b, 22g, 22r of the display panel 20 of the display system 300 (shown in FIG. 2) for the third light 62 incident at the angle θ3 that deviates from the first predetermined angle θ1 by at most about 5 degrees (shown in FIG. 6C). This may allow normal operation of the display panel 20 in case of acceptable deviations from the first predetermined angle θ1.

Referring to FIGS. 11-13, the reflection spectrum 41x for the first polarization may deviate based on different angles of incidence. For example, the reflective spectrum 41x may shift toward the blue end or red end of the spectrum from a position corresponding to the first predetermined angle θ1.

Figure 14:
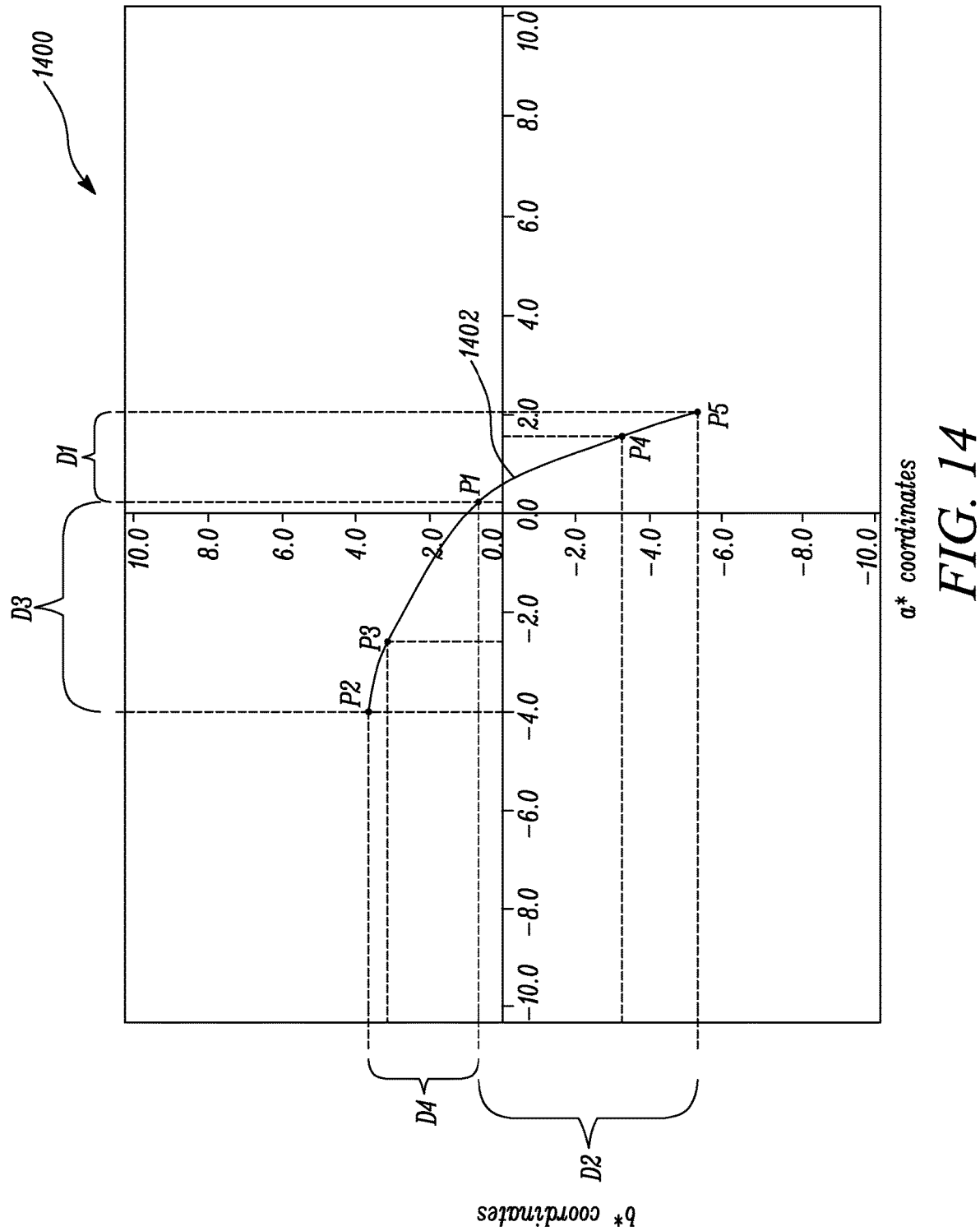
FIG. 14 is a graph illustrating CIELAB color coordinates of a reflective polarizer, according to an embodiment of the present disclosure.

FIG. 14 is a graph 1400 illustrating a CIELAB color space having an a* axis and a b* axis. The CIELAB color space is a color space defined by the International Commission on Illumination (abbreviated CIE) in 1976. The a* axis is along an axis of ordinates and the b* axis is along an axis of abscissas. The a* axis represents the green-red component, with green in the negative direction and red in the positive direction. The b* axis represents the blue-yellow component, with blue in the negative direction and yellow in the positive direction. The graph 1400 includes b* coordinates on the b* axis and a* coordinates on the a* axis. The a* and b* coordinates may be referred as CIELAB color coordinates.

The graph 1400 includes a deviation curve 1402 depicting the CIELAB color coordinates of the reflective polarizer 30 for lights incident at oblique angles (shown in FIGS. 6A-6C). The deviation curve 1402 may correspond to reflected light received from the reflective polarizer 30.

Specifically, a point P1 on the deviation curve 1402 depicts the CIELAB color coordinates of the reflective polarizer 30 for a light incident at 40 degrees with respect to the normal 37. Further, a point P2 on the deviation curve 1402 depicts the CIELAB color coordinates of the reflective polarizer 30 for a light incident at 30 degrees with respect to the normal 37. Further, a point P3 on the deviation curve 1402 depicts the CIELAB color coordinates of the reflective polarizer 30 for a light incident at 35 degrees with respect to the normal 37. Further, a point P4 on the deviation curve 1402 depicts the CIELAB color coordinates of the reflective polarizer 30 for a light incident at 45 degrees with respect to the normal 37. Further, a point P5 on the deviation curve 1402 depicts the CIELAB color coordinates of the reflective polarizer 30 for a light incident at 50 degrees with respect to the normal 37.

Referring to FIGS. 2, 6A, and 14, in some embodiments, for the first light 60 incident at the first predetermined angle θ1 from about 30 degrees to about 50 degrees with respect to the normal 37 and for the first polarization state, the reflective polarizer 30 reflects the first light 60 as a reflected light 28 having the a* coordinate with a magnitude of less than about 6 and the b* coordinate with a magnitude of less than about 6 in the CIELAB color space.

Referring to FIGS. 2, 6D, and 14, in some embodiments, for the first polarization state and for the light 63 incident on the reflective polarizer 30 at the angle θ4 that deviates from the first predetermined angle θ1 by at most about 10 degrees (shown in FIG. 6D), a change in each of the magnitudes of the a* and b* coordinates is from about 0.25 to about 5 in the CIELAB color space.

For example, for the first light 60 incident at the first predetermined angle θ1 equal to about 40 degrees, the angle θ4 that deviates from the first predetermined angle θ1 by at most about 10 degrees is between about 30 degrees and about 50 degrees. FIG. 14 shows changes in the magnitudes of a* and b* coordinates with respect to the values at the first predetermined angle θ1 of about 40 degrees. Specifically, changes in the magnitudes of a* and b* coordinates are shown for different values of the angle θ4.

In the illustrated example of FIG. 14, for the first predetermined angle θ1 equal to about 40 degrees and the angle θ4 equal to about 50 degrees, a change D1 in the magnitude of the a* coordinate is about 1.8. For the first predetermined angle θ1 equal to about 40 degrees and the angle θ4 equal to about 50 degrees, a change D2 in the magnitude of the b* coordinate is about 4.9.

Further, for the first predetermined angle θ1 equal to about 40 degrees and the angle θ4 equal to about 30 degrees, a change D3 in the magnitude of the a* coordinate is about 3.8. For the first predetermined angle θ1 equal to about 40 degrees and the angle θ4 equal to about 30 degrees, a change D4 in the magnitude of the b* coordinate is about 3.

Therefore, the changes D1, D2, D3, D4 in the respective magnitudes of the a* and b* coordinates are within about 0.25 to about 5 in the CIELAB color space. Therefore, the reflected light 28 has the a* and b* coordinates close to the neutral color point (i.e. a*=0 and b*=0) in the CIELAB color space. In other words, the reflective polarizer 30 may minimize variations of the a* and b* coordinates for acceptable deviations (e.g., with 10 degrees) from the design incident angle (i.e., the first predetermined angle θ1). Therefore, the reflective polarizer 30 may display low color shifts for acceptable deviations from the design incident angle.

Figure 15:
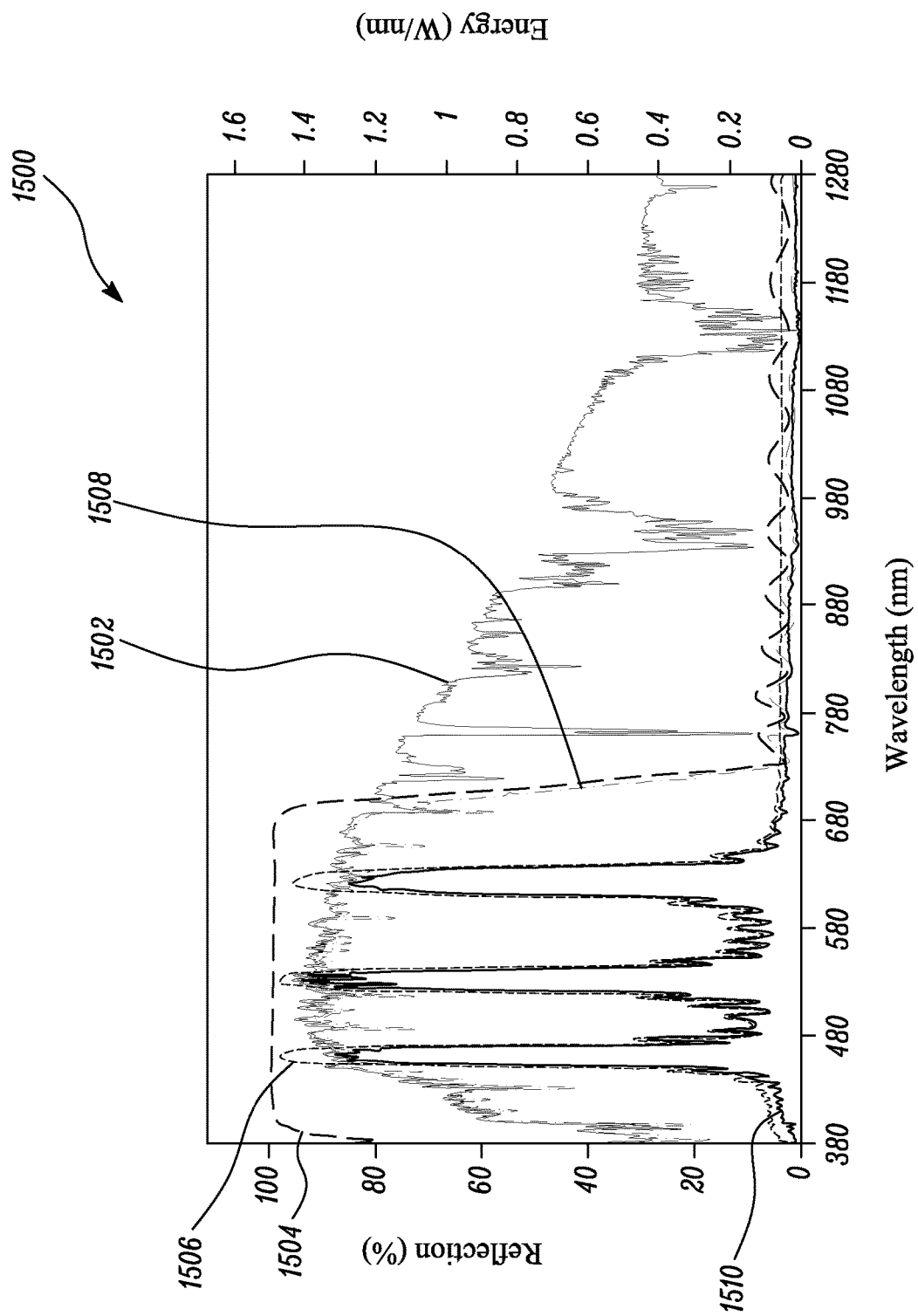
FIG. 15 is a graph illustrating reflectance versus wavelength for a conventional polarizer and a reflective polarizer corresponding to a solar irradiance spectrum, according to another embodiment of the present disclosure.

FIG. 15 illustrates a graph 1500 depicting a solar irradiance spectrum 1502, a reflection spectrum 1504 of a conventional polarizer, and a reflection spectrum 1506 of the reflective polarizer 30. The reflection spectrum 1506 may be substantially similar to the reflection spectrum 31x or the reflection spectrum 41x. The reflection spectrum 1506 depicts a reflection characteristic of the reflective polarizer 30 for the first light 50 (shown in FIG. 6A) incident at the first predetermined angle θ1 relative to the normal 37. The reflection spectrum 1506 depicts a variation of the reflectance of the reflective polarizer 30 with wavelength. Wavelength is expressed in nanometers (nm) in the abscissa. The reflection is expressed as reflection percentage in the left ordinate, and energy is expressed in the right ordinate. The energy is expressed in Watts per nm (W/nm).

The graph 1500 further illustrates curves 1508, 1510. The curve 1508 represents a variation of an energy reflected by the conventional polarizer with wavelength for the solar irradiance spectrum 1502. Similarly, the curve 1510 represents a variation of an energy of the reflected light 28 (shown in FIG. 2) reflected by the reflective polarizer 30 with wavelength for the solar irradiance spectrum 1502. The curves 1508, 1510 are obtained by multiplying the reflection spectrum 1504 and the reflection spectrum 1506, respectively, with the solar irradiance spectrum 1502. An area under the curve 1508 may depict a total energy reflected by the conventional polarizer for the solar irradiance spectrum 1502. Similarly, an area under the curve 1510 may depict a total energy reflected by the reflective polarizer 30 for the solar irradiance spectrum 1502.

Referring to FIGS. 2, 6A, and 15, in some embodiments, for the first light 60 incident at the first predetermined angle θ1 from about 30 degrees to about 50 degrees with respect to the normal 37, for the first polarization state and for a wavelength range from about 400 nm to about 700 nm, the reflective polarizer 30 reflects the first light 60 as the reflected light 28, such that the total energy of the reflected light 28 (as depicted by the curve 1510) is at least about 60% of the total energy of the first light 60 in the wavelength range from about 400 nm to about 700 nm. In other words, for the first polarization state and for the wavelength range from about 400 nm to about 700 nm, the reflective polarizer reflects the first light 60 as the reflected light 28, such that the total energy of the reflected light 28 is at least about 60% of the total energy of the first light 60. In some embodiments, for the first polarization state and for the wavelength range from about 400 nm to about 700 nm, the reflective polarizer 30 may reflect the first light 60 as the reflected light 28, such that the total energy of the reflected light 28 may be at least about 70%, at least about 75%, or at least about 80% of the total energy of the first light 60.

Further, as may be apparent from FIG. 15, the total energy of the reflected light 28 reflected by the reflective polarizer 30 may be substantially less as compared to the total energy reflected by the conventional polarizer. Specifically, the area under the curve 1510 may be substantially less than the area under the curve 1508. In some embodiments, the total energy of the reflected light 28 reflected by the reflective polarizer 30 may be less than about 50% of the total energy reflected by the conventional polarizer. In some embodiments, the total energy of the reflected light 28 reflected by the reflective polarizer 30 may be less than about 60%, less than about 65%, or less than about 70% of the total energy reflected by the conventional polarizer.

The total energy reflected by the conventional polarizer towards the display systems or HUDs may cause temporary failure of or permanent damage to the display panel 20. Thus, reduction in total energy reflected toward the display panel 20 by the reflective polarizer 30 may prevent any temporary failure of or permanent damage to the display panel 20.

EXAMPLES

The following methods and examples are offered for illustrative purposes only and is not intended to limit the scope of the disclosure in any way. Indeed, various modifications of the disclosure in addition to those shown and described herein will become apparent to those skilled in the art from the foregoing description and the following examples and fall within the scope of the appended claims.

A notched reflective polarizer (for example, the reflective polarizer 30 illustrated in FIG. 4) was modeled with optimized reflection peaks for a light incident at about 40 degrees. The reflection peaks were optimized to match exemplary display emission peaks at wavelengths of about 460 nm, about 530 nm, and about 625 nm corresponding to blue, green, and red wavelengths, respectively.

The notched reflective polarizer was molded and included multiple optical repeating units (ORUs) of high index optical (HIO) layers and low index optical (LIO) layers. The HIO layers and LIO layers were birefringent and isotropic, respectively. The HIO layers included a polymer composed of 90% polyethylene naphthalate (PEN) and 10% polyethylene terephthalate (PET), also known as 90/10 coPEN. The LIO layers included a blend of polycarbonate (PC) and copolyesters (PCTg), as described in U.S. Pat. No. 10,185,068, the disclosure of which is incorporated herein in its entirety by reference. The LIO layers were modeled such that a refractive index of the LIO layers was about 1.57 at the wavelength of 630 nm and the LIO layers remained substantially isotropic upon uniaxial orientation. Further, the molar ratio of the blend of polycarbonate and copolyesters (PC:PCTg) was about 85 mol % PC and 15 mol % PCTg. An average thickness profile of the HIO and LIO layers was mathematically generated, as shown in FIG. 5, to produce reflection spectrum as shown in FIGS. 11-13 with a f-ratio of 0.12.

Further, the HIO layers and the LIO layers were bounded by a protective skin layer from both sides. The protective skin layer had a low refractive index and had an average thickness of 2000 nm.

The refractive indices for the HIO layers, denoted by Nx, Ny, Nz along x, y, z axes, respectively, and for the LIO layers, denoted by Niso, for the wavelengths of 450 nm, 530 nm, and 630 nm, denoted by λ, are shown in Table 1 provided below.

TABLE 1

| Refractive Indices | | | | |
| --- | --- | --- | --- | --- |
| | HIO Layers | | | LIO Layers |
| λ | Nx | Ny | Nz | Niso |
| 450 nm | 1.9222 | 1.6087 | 1.5987 | 1.5962 |
| 530 nm | 1.8611 | 1.5794 | 1.5696 | 1.5801 |
| 630 nm | 1.8266 | 1.5651 | 1.5554 | 1.5701 |

Further, a computational model was used to calculate reflection and transmission properties of the notched reflective polarizer. The computational model was driven by a 4×4 matrix solver routine based on Berriman algorithm where reflection and transmission matrix elements can be computed for an arbitrary stack of 1-dimensional layers. Each of the HIO and LIO layers was defined by its average thickness and by a dispersive refractive index tensor where each principal element of the dispersive refractive index tensor is a function of wavelength.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A display system for displaying a virtual image to a passenger of a vehicle, the display system comprising:
a display panel configured to emit a polarized image light having a first polarization state and at least one emission spectrum having a full width at half maxima (FWHM); and
a reflective polarizer configured to receive and reflect the polarized image light as a first reflected polarized image light, the reflective polarizer comprising a reflection spectrum comprising at least one reflection band having a FWHM, such that:
for a first light incident at a first predetermined angle from about 30 degrees to about 50 degrees with respect to a normal to a major surface of the reflective polarizer:
for the first polarization state, the reflective polarizer reflects at least about 60% of the first light for at least one same first wavelength within the FWHM of the at least one reflection band and within the FWHM of the at least one emission spectrum;
for the first polarization state, the reflective polarizer transmits at least about 50% of the first light for at least one same second wavelength outside the FWHM of the at least one emission spectrum and outside the FWHM of the at least one reflection band; and
for an orthogonal second polarization state, the reflective polarizer transmits at least about 60% of the first light for each wavelength in the FWHM of the at least one emission spectrum and the FWHM of the at least one reflection band;
wherein, for a second light incident at a second predetermined angle less than about 30 degrees with respect to the normal to the major surface of the reflective polarizer, and for each of the first and second polarization states, the reflective polarizer transmits at least about 50% of the second light for the at least first wavelength.

2. The display system of claim 1, wherein, for the first light incident at the first predetermined angle from about 30 degrees to about 50 degrees with respect to the normal, an overlap between the FWHM of the at least one emission spectrum and the FWHM of the at least one reflection band is at least about 40% of the FWHM of the at least one emission spectrum.

3. The display system of claim 1, wherein, for the first light incident at the first predetermined angle from about 30 degrees to about 50 degrees with respect to the normal and for the first polarization state, the reflective polarizer reflects the first light as a reflected light having an a* coordinate with a magnitude of less than about 6 and a b* coordinate with a magnitude of less than about 6 in CIELAB color space, and wherein, for the first polarization state and for a light incident on the reflective polarizer at an angle that deviates from the first predetermined angle by at most about 10 degrees, a change in each of the magnitudes of the a* and b* coordinates is from about 0.25 to about 5.

4. The display system of claim 1, wherein the at least one emission spectrum comprises blue, green and red emission spectra having respective blue, green and red FWHMs, and wherein the at least one reflection band comprises blue, green, and red reflection bands having respective blue, green, and red FWHMs, such that for the first light incident at the first predetermined angle from about 30 degrees to about 50 degrees with respect to the normal:
for the first polarization state, the reflective polarizer reflects at least about 60% of the first light for the at least one same first wavelength within each of the FWHMs of the blue, green and red reflection bands and within each of the respective FWHMs of the blue, green and red emission spectra;
for the first polarization state, the reflective polarizer transmits at least about 50% of the first light for the at least one same second wavelength between the FWHMs of the blue and green reflection bands and between the FWHMs of the blue and green emission spectra, and for at least one same third wavelength between the FWHMs of the green and red reflection bands and between the FWHMs of the green and red emission spectra; and
for the second polarization state, the reflective polarizer transmits at least about 60% of the first light for each wavelength in the FWHMs of the blue, green and red reflection bands, each wavelength in the FWHMs of the blue, green and red emission spectra, and each wavelength therebetween.

5. The display system of claim 1, wherein the display system further comprises a mirror configured to receive and reflect the first reflected polarized image light as a second reflected polarized image light toward a windshield of the vehicle, and wherein, for at least the first polarization state, the mirror reflects at least about 70% of an incident light for each wavelength in the FWHM of the at least one emission spectrum.

6. The display system of claim 1, wherein, for the first light incident at the first predetermined angle from about 30 degrees to about 50 degrees with respect to the normal, for the first polarization state and for a wavelength range from about 400 nm to about 700 nm, the reflective polarizer reflects the first light as a reflected light, such that a total energy of the reflected light is at least about 60% of a total energy of the first light.

7. A display system for displaying a virtual image to a passenger of a vehicle, the display system comprising:
a display panel configured to emit a polarized image light having a first polarization state and substantially distinct blue, green, and red emission spectra having respective blue, green, and red full widths at half maxima (FWHMs);
a reflective polarizer configured to receive and reflect the polarized image light as a first reflected polarized image light, the reflective polarizer comprising a reflection spectrum comprising substantially distinct blue, green, and red reflection bands with respective blue, green, and red FWHMs, such that:
for a first light incident at a first predetermined angle from about 30 degrees to about 50 degrees with respect to a normal to a major surface of the reflective polarizer:
for the first polarization state, the reflective polarizer reflects at least about 60% of the first light for at least one same first wavelength within each of the FWHMs of the blue, green and red reflection bands and within each of the respective FWHMs of the blue, green, and red emission spectra;
for the first polarization state, the reflective polarizer transmits at least about 50% of the first light for at least one same second wavelength between the FWHMs of the blue and green reflection bands and between the FWHMs of the blue and green emission spectra, and for at least one same third wavelength between the FWHMs of the green and red reflection bands and between the FWHMs of the green and red emission spectra;

for an orthogonal second polarization state, the reflective polarizer transmits at least about 60% of the first light for each wavelength in the FWHMs of the blue, green and red reflection bands, each wavelength in the FWHMs of the blue, green and red emission spectra, and each wavelength therebetween; and wherein, for a second light incident at a second predetermined angle less than about 30 degrees with respect to the normal to the major surface of the reflective polarizer, and for each of the first and second polarization states, the reflective polarizer transmits at least about 50% of the second light for the at least first wavelength.

8. The display system of claim 7, wherein, for the first light incident at the first predetermined angle from about 30 degrees to about 50 degrees with respect to the normal, overlaps between the FWHMs of the blue, green and red emission spectra and the respective FWHMs of the blue, green and red reflective bands are at least about 40% of the respective FWHMs of the blue, green and red emission spectra, and wherein, for a third light incident on the reflective polarizer at an angle that deviates from the first predetermined angle by at most about 5 degrees, a change in each of the overlaps between the FWHMs of the blue, green and red emission spectra and the respective FWHMs of the blue, green and red reflective bands is from about 5% to about 50%.

9. A display system for displaying a virtual image to a passenger of a vehicle, the display system comprising:
a display panel configured to emit a polarized image light having a first polarization state and substantially distinct blue, green, and red emission spectra having respective blue, green, and red full widths at half maxima (FWHMs); and
a reflective polarizer configured to receive and reflect the polarized image light as a first reflected polarized image light, the first reflected polarized image light configured to be reflected toward the passenger after reflection from at least a windshield of the vehicle, such that for a first light incident at a first predetermined angle from about 30 degrees to about 50 degrees with respect to a normal to a major surface of the reflective polarizer, the reflective polarizer has:
an average total reflectance of greater than about 60% for the first polarization state across each of the blue, green and red FWHMs;
for the first polarization state, a transmittance of at least about 50% for at least one wavelength between the FWHMs of the blue and green emission spectra, and for at least one other wavelength between the FWHMs of the green and red emission spectra; and
for an orthogonal second polarization state, an average total transmittance of greater than about 70% across a visible wavelength range comprising at least each of the blue, green and red FWHMs;
wherein, for a second light incident at a second predetermined angle less than about 30 degrees with respect to the normal to the major surface of the reflective polarizer, and for each of the first and second polarization states, the reflective polarizer has an average total transmittance of at least about 50% across each of the blue, green and red FWHMs.

10. The display system of claim 9, wherein, for the first polarization state, the reflective polarizer reflects the first light as a reflected light having an a* coordinate with a magnitude of less than about 6 and a b* coordinate with a magnitude of less than about 6 in CIELAB color space, and wherein, for the first polarization state and for a light incident on the reflective polarizer at an angle that deviates from the first predetermined angle by at most about 10 degrees, a change in each of the magnitudes of the a* and b* coordinates is from about 0.25 to about 5.

* * * * *